United States Patent
Nakamura et al.

(10) Patent No.: US 10,589,650 B2
(45) Date of Patent: Mar. 17, 2020

(54) HEADREST DEVICE

(71) Applicant: NHK SPRING CO., LTD., Yokohama-shi, Kanagawa (JP)

(72) Inventors: Takeshi Nakamura, Yokohama (JP); Kenichi Katsube, Yokohama (JP); Junichi Takada, Yokohama (JP); Masamichi Kobori, Yokohama (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/110,864

(22) Filed: Aug. 23, 2018

(65) Prior Publication Data
US 2019/0061585 A1    Feb. 28, 2019

(30) Foreign Application Priority Data

Aug. 25, 2017 (JP) .................... 2017-162824

(51) Int. Cl.
| | | |
|---|---|---|
| *B60N 2/80* | (2018.01) | |
| *B60N 2/806* | (2018.01) | |
| *B60N 2/829* | (2018.01) | |
| *B60N 2/838* | (2018.01) | |
| *B60N 2/853* | (2018.01) | |
| *B60N 2/865* | (2018.01) | |
| *B60N 2/85* | (2018.01) | |

(52) U.S. Cl.
CPC .............. *B60N 2/865* (2018.02); *B60N 2/85* (2018.02); *B60N 2/853* (2018.02)

(58) Field of Classification Search
CPC ................. B60N 2/853; B60N 2/865
USPC ..................... 297/216.12, 391, 408, 409
See application file for complete search history.

(56) References Cited

U.S. PATENT DOCUMENTS

| | | | | |
|---|---|---|---|---|
| 6,550,856 B1 * | 4/2003 | Ganser | ..................... | B60N 2/20 297/216.12 X |
| 6,688,697 B2 * | 2/2004 | Baumann | ............... | B60N 2/865 297/391 |
| 6,715,829 B2 * | 4/2004 | Svantesson | ............ | B60N 2/865 297/216.12 |
| 6,805,411 B2 * | 10/2004 | Gramss | .................. | B60N 2/865 297/408 |

(Continued)

FOREIGN PATENT DOCUMENTS

JP        2006-151111 A        6/2006

*Primary Examiner* — Rodney B White
(74) *Attorney, Agent, or Firm* — Knobbe, Martens, Olson & Bear, LLP

(57) ABSTRACT

A headrest device includes: a front-rear movement mechanism that moves a moving member in a seat front-rear direction with respect to a base member supported at an upper end portion of a seatback; a head support section that is coupled to the moving member so as to be capable of rotating about an axis running in a seat left-right direction, and that includes a front face configuring a support face to support a head of a seated occupant; and an angle changing mechanism that includes a link member spanning between the head support section and the base member, the link member being rotated with respect to the base member about an axis running in the seat left-right direction by the movement of the moving member so as to rotate the head support section with respect to the moving member about an axis running in the seat left-right direction.

11 Claims, 26 Drawing Sheets

(56) References Cited

U.S. PATENT DOCUMENTS

| | | | |
|---|---|---|---|
| 7,070,235 B2* | 7/2006 | Schilling | B60N 2/888 |
| | | | 297/216.12 |
| 7,073,856 B2* | 7/2006 | Akaike | B60N 2/0232 |
| | | | 297/216.12 |
| 7,195,313 B2* | 3/2007 | Hippel | B60N 2/853 |
| | | | 297/216.12 |
| 7,344,191 B2* | 3/2008 | Schilling | B60N 2/888 |
| | | | 297/216.12 |
| 7,350,859 B2* | 4/2008 | Klukowski | B60N 2/888 |
| | | | 297/216.12 |
| 7,484,797 B2* | 2/2009 | Akaike | B60N 2/821 |
| | | | 297/216.12 |
| 7,517,015 B2* | 4/2009 | Terada | B60N 2/888 |
| | | | 297/216.12 |
| 7,520,564 B2* | 4/2009 | Woerner | B60N 2/865 |
| | | | 297/216.12 |
| 7,611,196 B2* | 11/2009 | Terada | B60N 2/888 |
| | | | 297/216.12 |
| 7,618,091 B2* | 11/2009 | Akaike | B60N 2/002 |
| | | | 297/216.12 |
| 7,717,507 B2* | 5/2010 | Toda | B60N 2/862 |
| | | | 297/216.12 |
| 7,770,967 B2* | 8/2010 | Hirota | B60N 2/002 |
| | | | 297/216.12 |
| 7,963,598 B2* | 6/2011 | Akaike | B60N 2/002 |
| | | | 297/216.12 |
| 8,033,601 B2* | 10/2011 | Otsuka | B60N 2/42781 |
| | | | 297/216.12 |
| 8,632,125 B2* | 1/2014 | Yamaguchi | B60N 2/002 |
| | | | 297/216.12 |
| 8,833,851 B2* | 9/2014 | Corral Rodriguez | B60N 2/888 |
| | | | 297/216.12 |
| 8,936,311 B2* | 1/2015 | Corral Rodriguez | |
| | | | B60N 2/42727 |
| | | | 297/216.12 |
| 9,333,887 B2* | 5/2016 | Talamonti | B60N 2/874 |
| 9,789,794 B1* | 10/2017 | Roychoudhury | B60N 2/4228 |
| 9,987,958 B2* | 6/2018 | Kondrad | B60N 2/865 |
| 10,144,322 B2* | 12/2018 | Line | B60N 2/58 |
| 10,315,546 B2* | 6/2019 | An | A47C 7/38 |
| 2004/0262974 A1* | 12/2004 | Terada | B60N 2/865 |
| | | | 297/407 |
| 2007/0246989 A1* | 10/2007 | Brockman | B60N 2/865 |
| | | | 297/391 |
| 2015/0130247 A1* | 5/2015 | Kondrad | B60N 2/821 |
| | | | 297/410 |
| 2015/0130248 A1* | 5/2015 | Line | B60N 2/865 |
| | | | 297/410 |
| 2016/0129816 A1* | 5/2016 | Lee | B60N 2/865 |
| | | | 297/409 |
| 2017/0174108 A1* | 6/2017 | An | B60N 2/0232 |
| 2017/0232873 A1* | 8/2017 | Hall | B60N 2/06 |
| | | | 297/180.12 |
| 2017/0313217 A1* | 11/2017 | Line | B60N 2/865 |
| 2017/0313218 A1* | 11/2017 | Line | B60N 2/0232 |
| 2017/0313219 A1* | 11/2017 | Line | B60N 2/0232 |

* cited by examiner

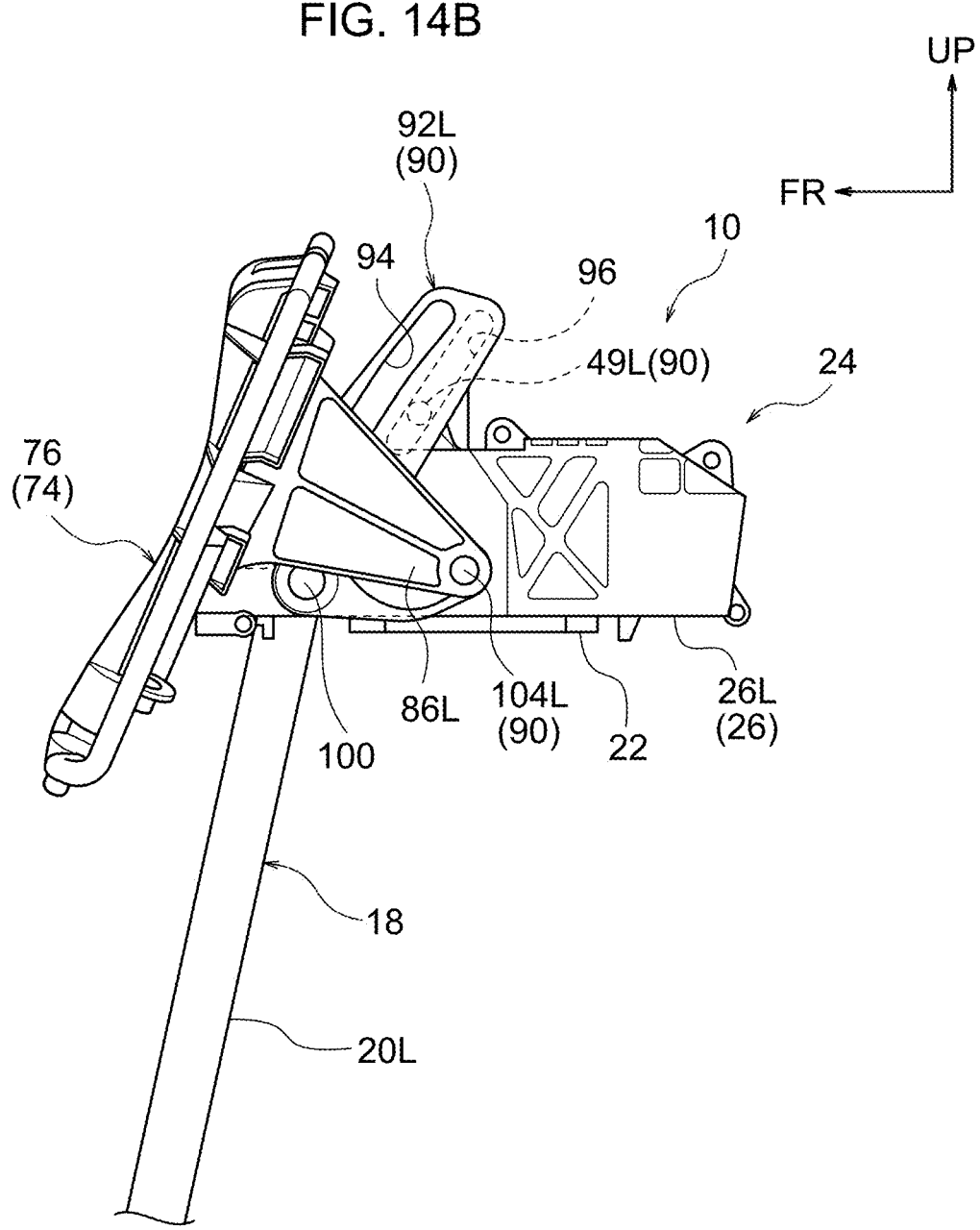

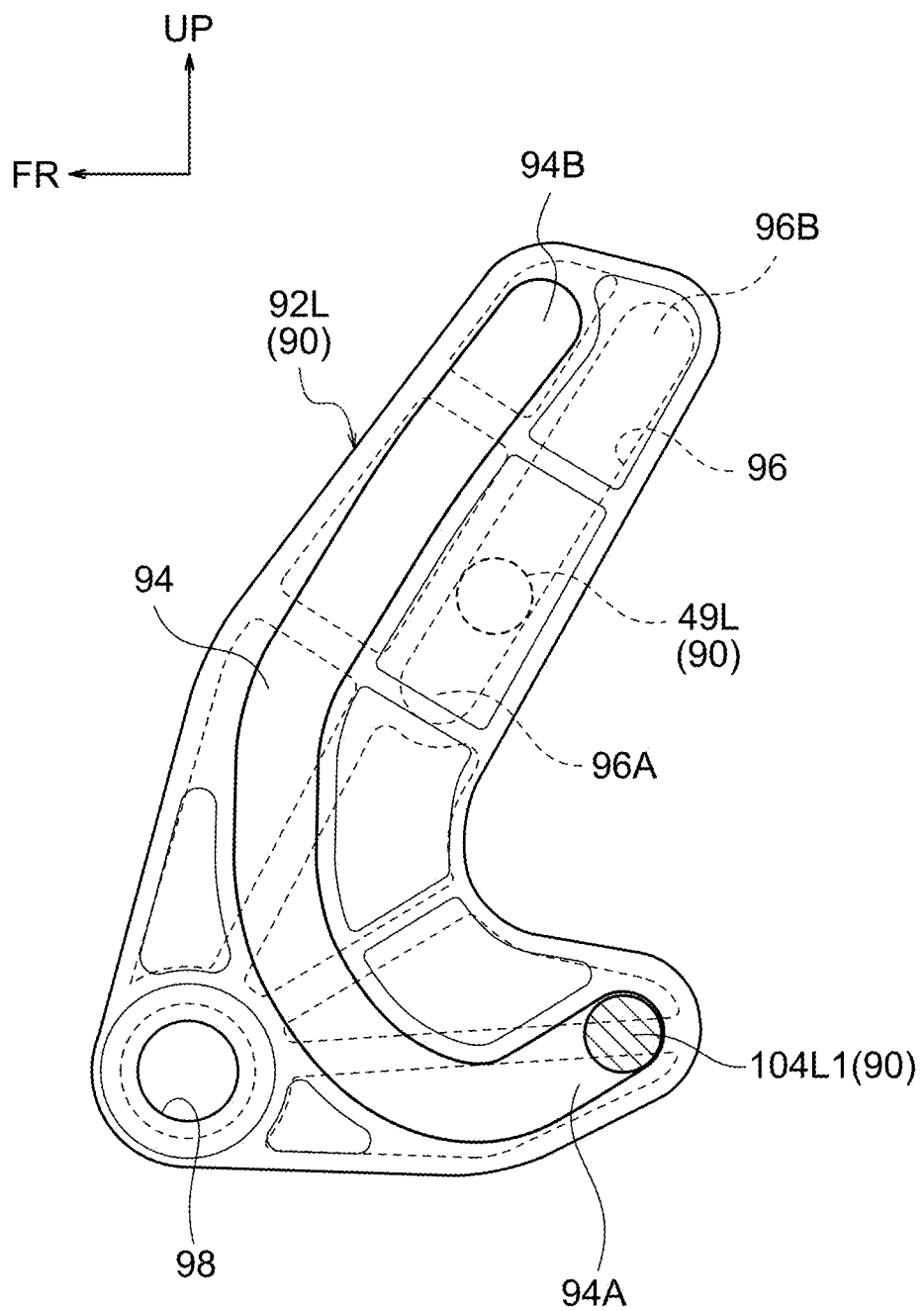

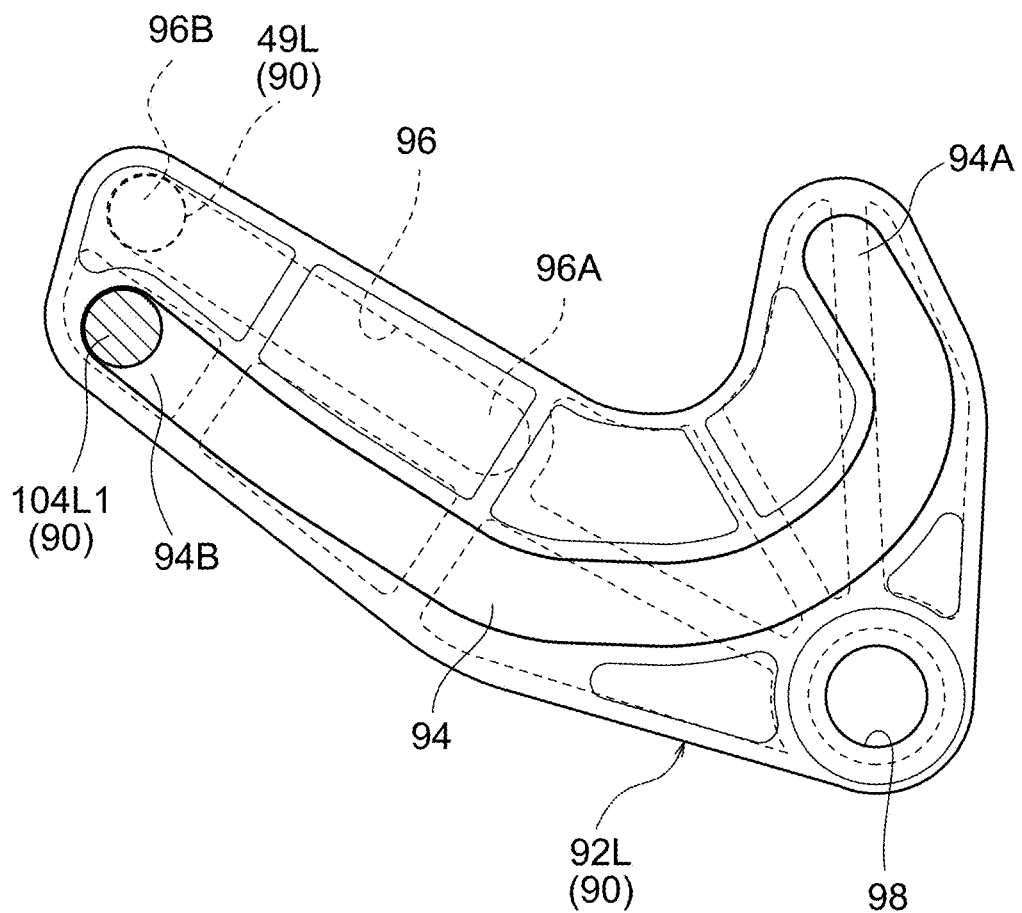

HEADREST DEVICE

CROSS-REFERENCE TO RELATED APPLICATION

This application is based on and claims priority under 35 USC 119 from Japanese Patent Application No. 2017-162824 filed on Aug. 25, 2017, the disclosure of which is incorporated by reference herein.

BACKGROUND

Technical Field

The present disclosure relates to a headrest device.

Related Art

Japanese Patent Application Laid-Open (JP-A) No. 2006-151111 describes a headrest in which a load-bearing section that bears the head of a seated occupant is moved in the front-rear direction of a vehicle seat by a drive unit that includes a scissors link mechanism. A good positional relationship is thus achieved between a bearing-standby position of the load-bearing section and the position of the head of the seated occupant.

However, in the headrest configured as described above, an inclination angle of the load-bearing section (head support section) does not change when the head-bearing section moves in the seat front-rear direction. The head therefore cannot be supported in an appropriate manner by the head support section in cases in which, for example, the seated occupant directs their head (face) toward the front side of the vehicle when a seatback is in a reclined state, making the comfort of the seated occupant difficult to secure.

SUMMARY

In consideration of the above circumstances, an object of the present disclosure is to obtain a headrest device that is capable of changing the inclination angle of a head support section accompanying movement of the head support section in a seat front-rear direction, and that offers a high degree of freedom for setting the amount of change in the inclination angle.

A first aspect of the present disclosure is a headrest device including a front-rear movement mechanism, a head support section, and an angle changing mechanism. The front-rear movement mechanism moves a moving member in a seat front-rear direction with respect to a base member supported at an upper end portion of a seatback. The head support section is coupled to the moving member so as to be capable of rotating about an axis running in a seat left-right direction, and includes a front face configuring a support face to support a head of a seated occupant. The angle changing mechanism includes a link member spanning between the head support section and the base member, the link member being rotated with respect to the base member about an axis running in the seat left-right direction by the movement of the moving member so as to rotate the head support section with respect to the moving member about an axis running in the seat left-right direction.

Note that in the first aspect, the "seat front-rear direction" and "seat left-right direction" indicate directions of a seat when the seatback is in an upright state (a non-reclined state).

According to the first aspect of the present disclosure, the front-rear movement mechanism moves the moving member in the seat front-rear direction with respect to the base member supported at the upper end portion of the seatback. The head support section, of which the front face configures the support face, is coupled to the moving member so as to be capable of rotating about an axis running in the seat left-right direction. The link member of the angle changing mechanism spans between the head support section and the base member. The movement of the moving member rotates the link member with respect to the base member about an axis running in the seat left-right direction, thereby rotating the head support section with respect to the moving member section about an axis running in the seat left-right direction. This thereby enables the inclination angle of the head support section to be changed accompanying movement of the head support section in the seat front-rear direction. Moreover, the amount of change of the inclination angle can be modified by the setting of the shape of the link member, thereby achieving a high degree of freedom for setting the amount of change in the inclination angle.

A headrest device of a second aspect of the present disclosure is the headrest device of the first aspect, wherein the angle changing mechanism causes the head support section to incline forward with respect to the moving member when the head support section moves in a seat-forward direction with respect to the base member.

In the second aspect of the present disclosure, when the front-rear movement mechanism moves the moving member together with the head support section in the seat-forward direction with respect to the base member, the angle changing mechanism causes the head support section to incline forward with respect to the moving member (causes the orientation of the head support section to tip forward). This thereby enables the head of a seated occupant to be supported in an appropriate manner by the head support section, for example when the seatback is in a reclined state and the seated occupant directs their head (face) toward the vehicle front side. This thereby enables the comfort of the seated occupant to be improved.

A headrest device of a third aspect of the present disclosure is the headrest device of the first aspect, wherein the link member is formed with a rotation groove and an angle changing groove, each being open toward a seat left-right direction side. The angle changing mechanism includes a first projection and a second projection. The first projection projects from the moving member and fits together with the rotation groove, and slides within the rotation groove during movement of the moving member with respect to the base member so as to rotate the link member with respect to the base member. The second projection projects from the head support section and fits together with the angle changing groove, and slides within the angle changing groove during rotation of the link member with respect to the base member so as to rotate the head support section with respect to the moving member.

In the headrest device of the third aspect of the present disclosure, the link member that spans between the head support section and the base member is formed with the rotation groove and the angle changing groove, each of which is open toward a seat left-right direction side. The first projection that projects from the moving member fits together with the rotation groove. The first projection slides within the rotation groove during movement of the moving member with respect to the base member so as to rotate the link member with respect to the base member. The second projection that projects from the head support section fits together with the angle changing groove. The second projection slides within the angle changing groove during rotation of the link member with respect to the base member so as to rotate the head support section with respect to the moving member. This accordingly changes the inclination angle of the head support section. This configuration enables the amount of change of the inclination angle of the head support section to be modified (adjusted) easily by setting the shapes of the rotation groove and the angle changing groove.

A headrest device of a fourth aspect of the present disclosure is the headrest device of the third aspect, wherein the angle changing groove is formed in one seat left-right direction side face of the link member, and the rotation groove is formed in another seat left-right direction side face of the link member.

In the headrest device of the fourth aspect of the present disclosure, the rotation groove, into which the first projection projecting from the moving member is fitted, and the angle changing groove, into which the second projection projecting from the head support section is fitted, are formed in separate seat left-right direction side faces of the link member. This facilitates setting of the shape of the moving member and the head support section such that the first projection and the second projection fit together with the rotation groove and the angle changing groove, and also offers a greater degree of freedom for setting the shape of the respective grooves. Moreover, the size of the link member can be reduced.

A headrest device of a fifth aspect of the present disclosure is the headrest device of the fourth aspect, wherein the rotation groove and the angle changing groove are disposed so as not to be superimposed on one another when the link member is viewed along the seat left-right direction.

In the headrest device of the fifth aspect of the present disclosure, the rotation groove and the angle changing groove formed in separate seat left-right direction side faces of the link member are disposed so as not to be superimposed on one another when the link member is viewed along the seat left-right direction. This enables, for example, the link member to be configured with a thinner dimension in the seat left-right direction.

A headrest device of a sixth aspect of the present disclosure is the headrest device of the first aspect, wherein the angle changing mechanism includes a left and right pair of the link members disposed one on either seat left-right direction side of the base member.

In the headrest device of the sixth aspect of the present disclosure, the pair of left and right link members provided to the angle changing mechanism are disposed one on either seat left-right direction side of the base member of the front-rear movement mechanism. The left and right pair of link members span between the head support section and the base member, thereby achieving good support rigidity when the head of the seated occupant is being supported by the head support section.

A headrest device of a seventh aspect of the present disclosure is the headrest device of the first aspect, wherein the base member is formed with a pair of upper and lower guide grooves running above and below one another in a seat up-down direction, each guide groove extending in the seat front-rear direction and being open on a seat left-right direction side. Moreover, the moving member is formed with a pair of upper and lower guide projections, the respective guide projections being fitted together with the pair of guide grooves so as to be capable of sliding along the guide grooves, and of the pair of upper and lower guide projections, at least one guide projection is formed in an elongated shape with its length in the seat front-rear direction.

In the headrest device of the seventh aspect of the present disclosure, the base member is formed with the pair of upper and lower guide grooves running above and below one another in the seat up-down direction. Each guide groove extends in the seat front-rear direction and is open on a seat left-right direction side. Moreover, the moving member is formed with the pair of upper and lower guide projections that fit together with the pair of guide grooves so as to be capable of sliding along the guide grooves. At least one out of the upper and lower guide projections is formed in an elongated shape with its length in the seat front-rear direction. This thereby enables the moving member to be prevented or effectively suppressed from rattling against the base member, while the moving member is supported by the base member such that the moving member is capable of moving in the seat front-rear direction with respect to the base member.

A headrest device of an eighth aspect of the present disclosure is the headrest device of the first aspect, further including a biasing member that spans between the head support section and the moving member, and that biases the head support section toward one rotation direction side with respect to the moving member.

In the headrest device of the eighth aspect of the present disclosure, the head support section that is rotatably coupled to the moving member is suppressed from rotating with respect to the moving member by the link member that spans between the head support section and the base member. Moreover, the head support section is biased toward the one rotation direction side with respect to the moving member by the biasing member that spans between the head support section and the moving member. Rattling of the head support section can thus be prevented or effectively suppressed.

A headrest device of a ninth aspect of the present disclosure is the headrest device of the first aspect, wherein the front-rear movement mechanism includes a feed screw mechanism configured including a feed screw which is rotated about an axis running in the seat front-rear direction, and the moving member is moved in the seat front-rear direction with respect to the base member by the feed screw mechanism.

According to the headrest device of the ninth aspect of the present disclosure, the feed screw mechanism that moves the moving member in the seat front-rear direction with respect to the base member is configured including the feed screw that is rotated about an axis running in the seat front-rear direction. This thereby enables a simple and compact configuration that secures a large movement stroke of the moving member.

As described above, the headrest device of the present disclosure is capable of changing the inclination angle of a head support section accompanying movement of the head support section in a seat front-rear direction, and offers a high degree of freedom for setting the amount of change in the inclination angle.

BRIEF DESCRIPTION OF THE DRAWINGS

Exemplary embodiments of the present invention will be described in detail based on the following figures, wherein:

FIG. 14B is a side view illustrating a state in which a covering and a pad of the head support section, and a fixed cover and a movable cover of a base section, have been removed from the headrest device illustrated in FIG. 14A;

FIG. 14C is an enlarged side view illustrating the link frame illustrated in FIG. 14B;

FIG. 17C is an enlarged side view illustrating the link frame illustrated in FIG. 17B.

DETAILED DESCRIPTION

Figure 1:
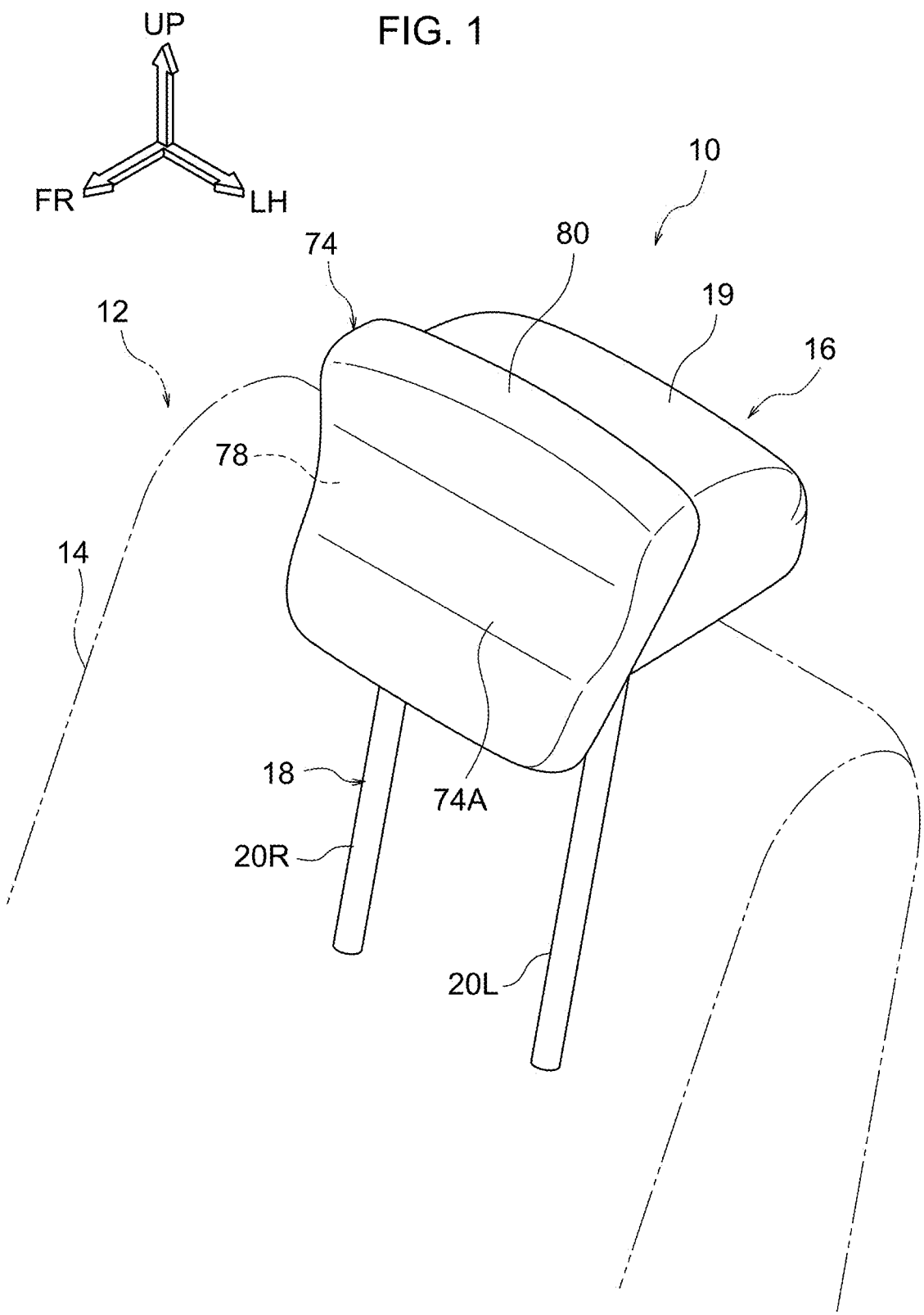
FIG. 1 is a perspective view illustrating a state in which a head support section of a headrest device according to an exemplary embodiment of the present disclosure is positioned at a rearmost position.

Explanation follows regarding a headrest device 10 according to an exemplary embodiment of the present disclosure, with reference to FIG. 1 to FIG. 18. Note that in the drawings, the arrow FR, the arrow UP, the arrow LH, and the arrow RH respectively indicate the front, upper side, left, and right of a vehicle seat 12 to which the headrest device 10 is applied. These directions correspond to an upright state (a non-reclined state) of a seatback 14 of the vehicle seat 12. In the following explanation, unless specifically stated otherwise, reference simply to front, rear, left, right, upward, and downward directions refers to these directions of the vehicle seat 12. Further, in the drawings, some reference numerals may be omitted in order to make the illustration easier to comprehend.

Configuration

As illustrated in FIG. 1 to FIG. 6, the headrest device 10 according to the present exemplary embodiment is configured by a base section 16 and a head support section (seat face) 74. The headrest device 10 is disposed at the upper side of the seatback 14 and is centrally disposed in a left-right direction (width direction) of the vehicle seat 12. The base section 16 includes a frame assembly 18, a front-rear movement mechanism 24, an angle changing mechanism 90, a fixed cover 17, and a movable cover 19.

The frame assembly 18 is configured by a pair of left and right legs 20R, 20L which are, for example, manufactured from metal pipes, and a bracket 22 which is, for example, manufactured by pressing sheet metal. The bracket 22 is formed in a rectangular plate shape in plan view, and is bent toward the seat upper side at both left and right end portions. The left and right legs 20R, 20L are disposed alongside each other in the seat left-right direction, and the length directions thereof are oriented along the seat up-down direction. Upper end portions of the left and right legs 20R, 20L are joined to front end portions of the bracket 22 at both the left and right end portions of the bracket 22 by a method such as welding. The legs 20R, 20L are also coupled to an upper end portion of a seatback frame, not illustrated in the drawings, provided to the seatback 14.

The front-rear movement mechanism 24 is configured by a base frame 26, serving as a base member, a front-rear movable frame 46, serving as a moving member, and a feed screw mechanism 60 configuring a motor assembly (drive mechanism). The base frame 26 is formed substantially in the shape of a box with its length direction in the seat front-rear direction, and is open toward the seat front side. The base frame 26 is disposed above the bracket 22 described above. The base frame 26 is configured by joining together a left side portion 26L, configuring a left side portion of the base frame 26, and a right side portion 26R, configuring a right side portion of the base frame 26.

Figure 4:
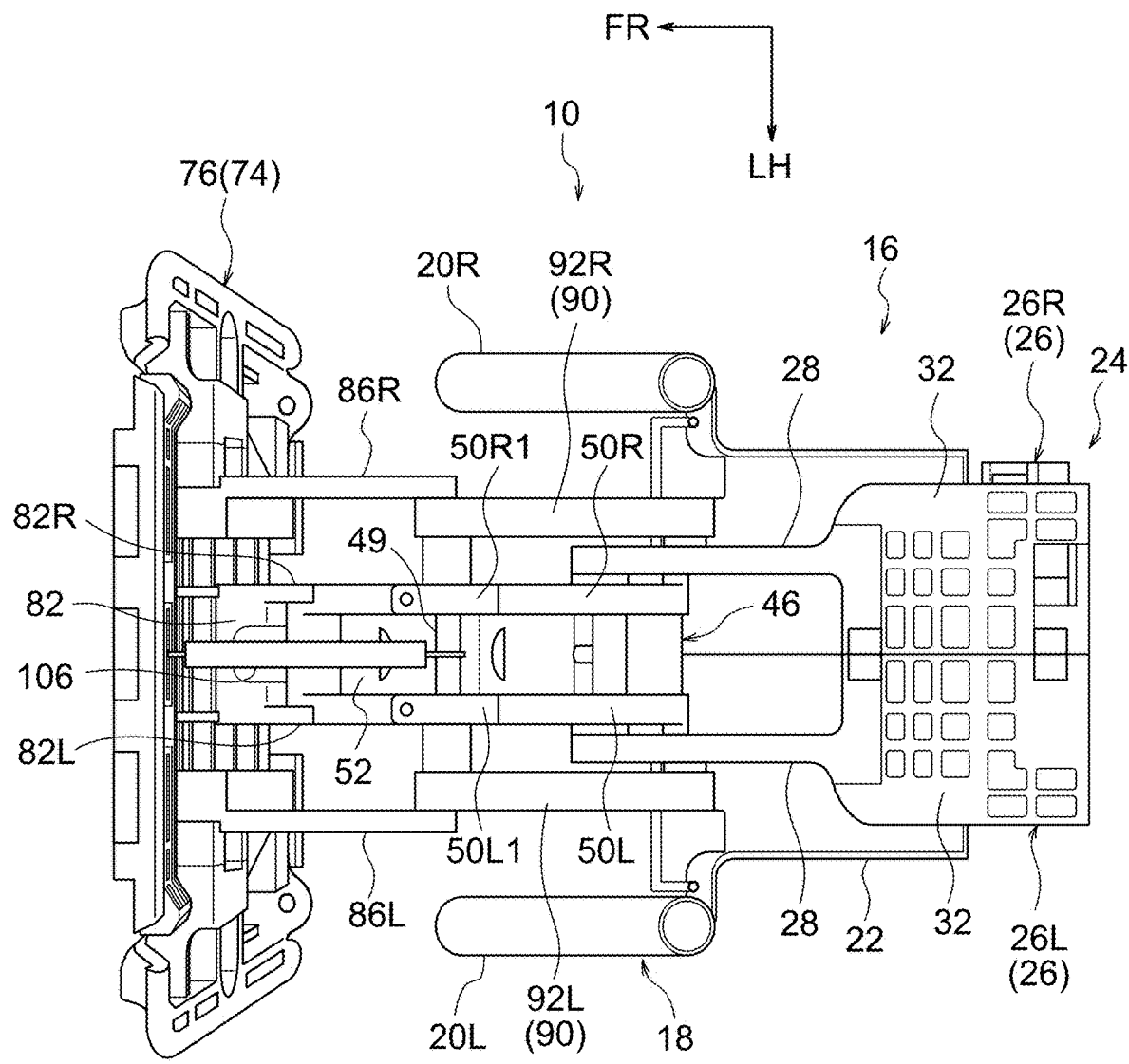
FIG. 4 is a plan view illustrating configuration of relevant portions of the headrest device.
Figure 5:
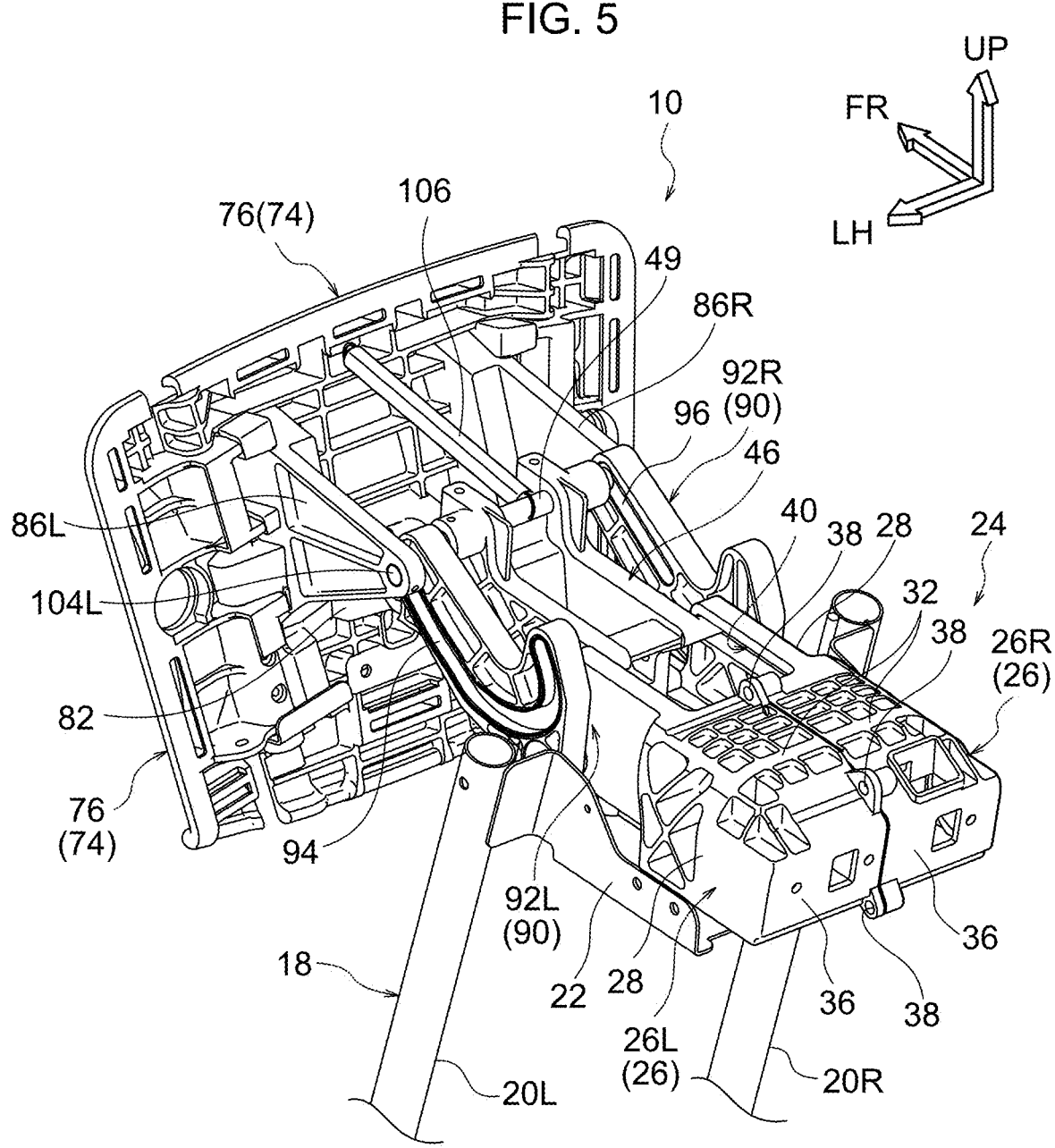
FIG. 5 is a perspective view illustrating configuration of relevant portions of the headrest device.
Figure 7:
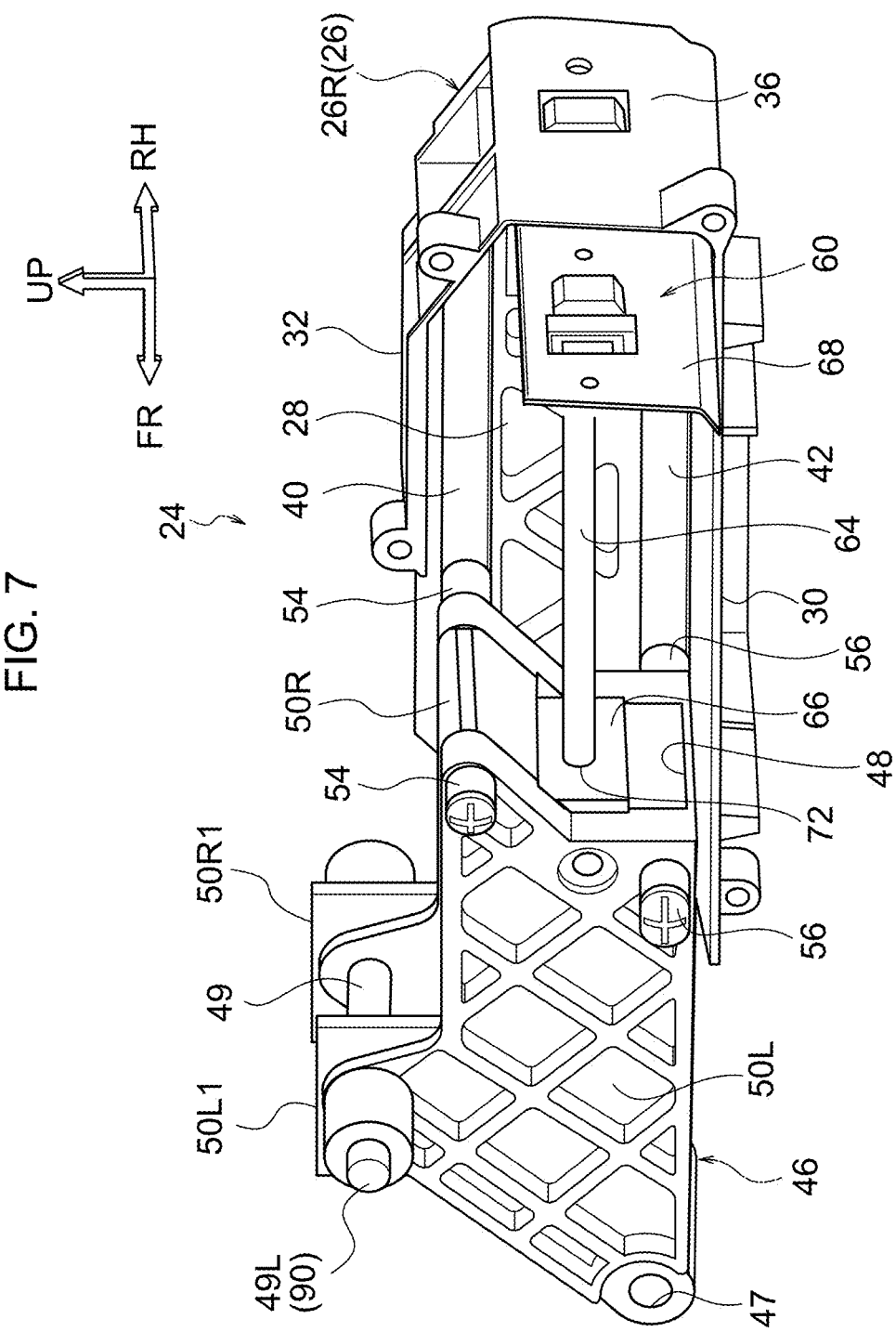
FIG. 7 is a perspective view illustrating configuration of part of a front-rear movement mechanism of the headrest device.

The left side portion 26L and the right side portion 26R are, for example, manufactured by resin injection molding, and each is substantially configured in the shape of a box that is open toward the seat front side and a seat left-right direction (seat width direction) central side. The left side portion 26L and the right side portion 26R are formed with left-right symmetry to each other. As illustrated in FIG. 4, FIG. 5, and FIG. 7, the left side portion 26L and the right side portion 26R each include a side wall 28, a lower wall 30 extending from a lower end portion of the side wall 28 toward the seat left-right direction (seat width direction) central side, an upper wall 32 extending from an upper end portion of the side wall 28 toward the seat width direction central side, and a rear wall 36 extending from a rear end portion of the side wall 28 toward the seat width direction central side, and vertically linking the upper wall 32 and the lower wall 30 together. The upper wall 32 is formed shorter than the side wall 28 and the lower wall 30 in the seat front-rear direction, and is disposed set back further toward the seat rear side than the side wall 28 and the lower wall 30. The left side portion 26L and the right side portion 26R with the above configuration are joined together by plural screws 38 (see FIG. 5). The left side portion 26L and the right side portion 26R are fixed to an upper face of the bracket 22 by screws, not illustrated in the drawings. The base frame 26 is thus supported on an upper end portion of the seatback 14 through the frame assembly 18.

Figure 6:
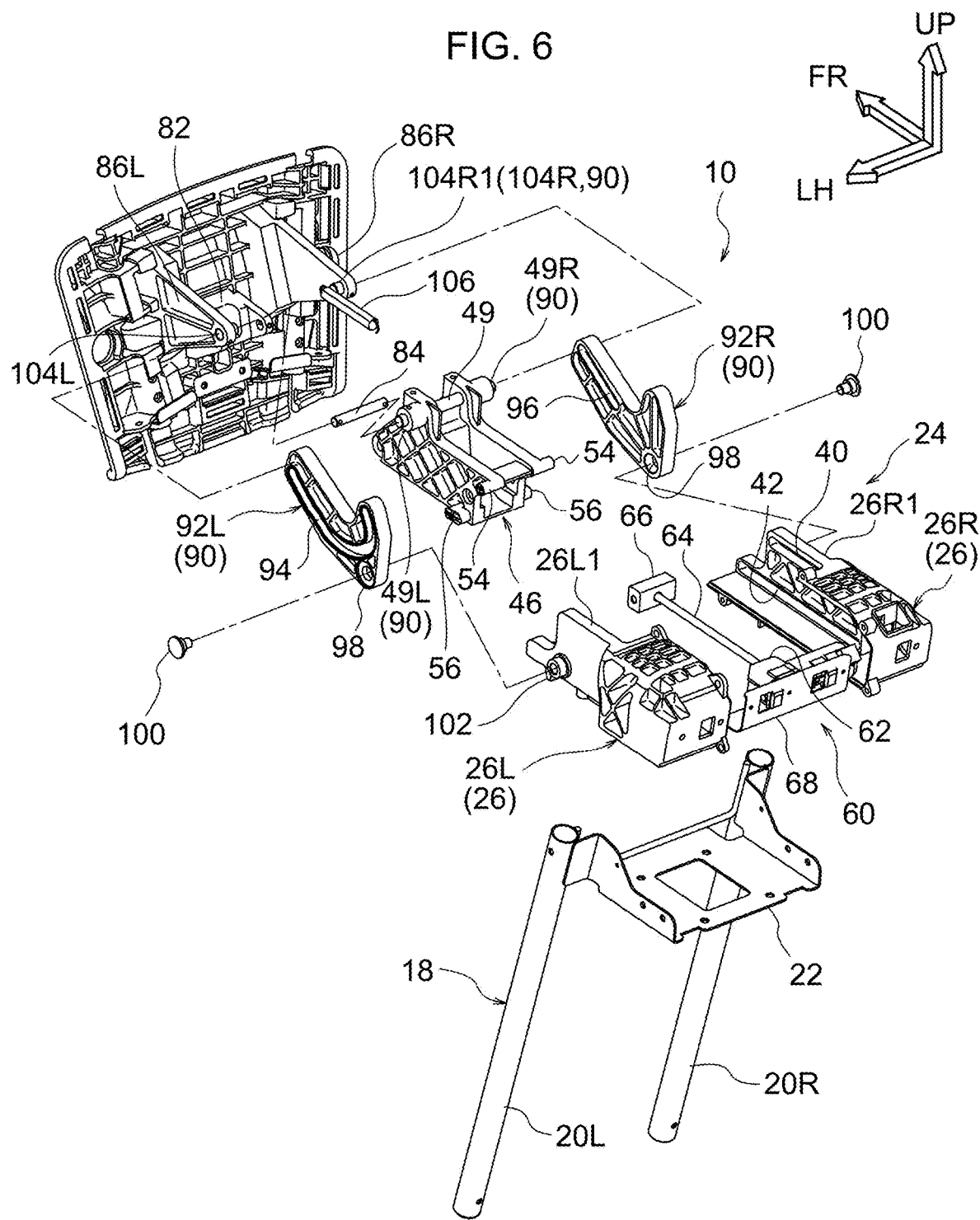
FIG. 6 is an exploded perspective view illustrating configuration of relevant portions of the headrest device.

Mutually opposing faces of the side walls 28 of the left side portion 26L and the right side portion 26R are each formed with a pair of upper and lower guide grooves 40, 42 (see FIG. 6 and FIG. 7). Note that the guide grooves 40, 42 formed in the side wall 28 of the left side portion 26L are not illustrated in the drawings. However, as described above, the left side portion 26L and the right side portion 26R are formed with left-right symmetry to each other. The guide grooves 40, 42 extend in the seat front-rear direction, and are each open toward one side in the seat left-right direction. More specifically, the guide grooves 40, 42 formed in the side wall 28 of the left side portion 26L (not illustrated in the drawings) are open toward the right side of the seat, and the guide grooves 40, 42 formed in the side wall 28 of the right side portion 26R are open toward the left side of the seat. The guide grooves 40, 42 are aligned to the front-rear movable frame 46.

Figure 8:
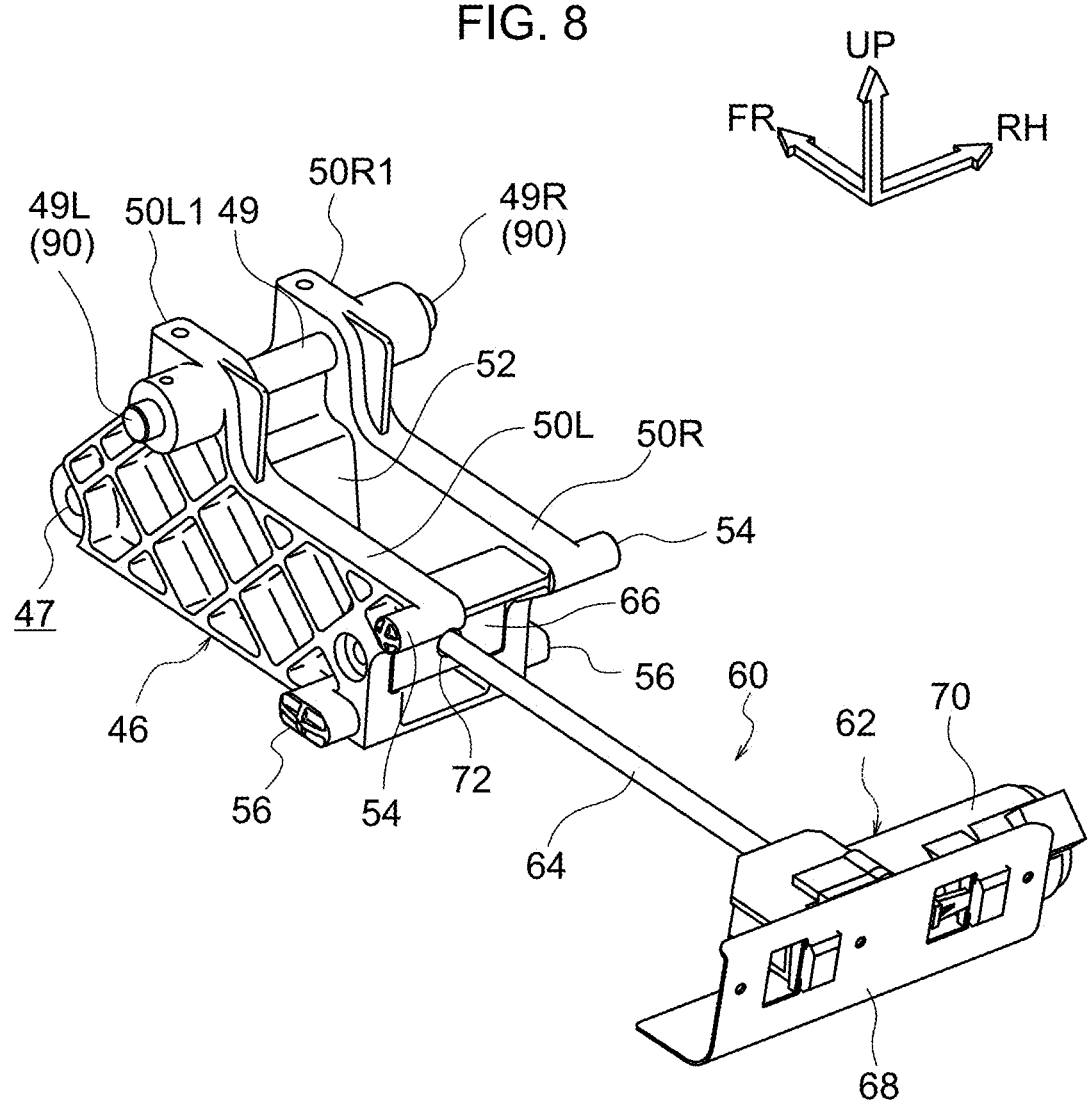
FIG. 8 is a perspective view illustrating configuration of a front-rear movable frame and feed screw of a front-rear movement mechanism.

The front-rear movable frame 46 is, for example, manufactured by resin injection molding, and overall is formed in an substantially rectangular block shape with its length direction along the seat front-rear direction (substantially in a box shape opening toward the seat rear side and the seat upper side). Specifically, as illustrated in FIG. 7 and FIG. 8, the front-rear movable frame 46 includes a lower wall 48, left and right side walls 50L, 50R extending toward the seat upper side from both left and right end portions of the lower wall 48, and a front wall 52 extending from a front portion of the lower wall 48 toward the seat upper side and linking front portions of the left and right side walls 50L, 50R together in the seat left-right direction. Front faces of the left and right side walls 50L, 50R and a front face of the front wall 52 are inclined toward the seat rear side on progression toward the seat upper side. Front portions of the left and right side walls 50L, 50R are formed with upward projections 50L1, 50R1 that project further toward the seat upper side than rear portions of the left and right side walls 50L, 50R.

A pair of upper and lower guide projections 54, 56 are integrally formed to rear end portions of both the left and right side walls 50L, 50R. The upper and lower guide projections 54, 56 project from the left and right side walls 50L, 50R toward the outside in the seat left-right direction. The guide projections 54, these being on the upper side, are formed in circular shapes as viewed along the seat left-right direction, and the guide projections 56, these being on the lower side, are formed in elliptical shapes (elongated shapes) that are long in the seat front-rear direction as viewed along the seat left-right direction. Note that configuration may be made in which the guide projections 54 on the upper side are formed with elliptical shapes that are long in the seat front-rear direction as viewed along the seat left-right direction, and the lower side guide projections 56 are formed with circular shapes as viewed along the seat left-right direction, or configuration may be made in which both the upper and lower guide projections 54, 56 are formed with elliptical shapes that are long in the seat front-rear direction as viewed along the seat left-right direction.

The upper and lower guide projections 54, 56 formed on the side wall 50L on the left side fit together with the upper and lower guide grooves 40, 42 (not illustrated in the drawings) of the left side portion 26L of the base frame 26 described above, and are capable of sliding along the seat front-rear direction in the guide grooves 40, 42. The upper and lower guide projections 54, 56 formed on the side wall 50R on the right side fit together with the upper and lower guide grooves 40, 42 of the right side portion 26R of the base frame 26 so as to be capable of sliding along the seat front-rear direction in the guide grooves 40, 42. The front-rear movable frame 46 is thus supported so as to be capable of moving (capable of sliding) in the seat front-rear direction with respect to the base frame 26. The feed screw mechanism 60 is disposed between the front-rear movable frame 46 and the rear wall 36 of the base frame 26.

As illustrated in FIG. 6 to FIG. 8, the feed screw mechanism 60 includes a motor unit 62, a feed screw 64, and a lead nut 66. Overall, the motor unit 62 is formed in an elongated shape long in the seat left-right direction, and is disposed at a rear end portion of the base frame 26. The motor unit 62 is fixed to the base frame 26 through an attachment bracket 68 which is, for example, manufactured by pressing sheet metal. The feed screw 64 is disposed with its axial direction along the seat front-rear direction, and a rear end portion of the feed screw 64 is inserted into a case of the motor unit 62. Rotation force of a motor 70 of the motor unit 62 is transmitted to the feed screw 64, thereby rotating the feed screw 64 about an axis running in the seat front-rear direction. The motor 70 is electrically connected to a switch, not illustrated in the drawings, installed for example on a side face of a seat cushion (not illustrated in the drawings) of the vehicle seat 12. The motor 70 is rotated forward and backward according to operation of the switch.

The lead nut 66 is, for example, formed from metal and has an angular column shape that is long in the seat left-right direction. The lead nut 66 is disposed between rear end portions of the left and right side walls 50L, 50R of the front-rear movable frame 46. The lead nut 66 is fixed to the front-rear movable frame 46 by a pair of left and right screws (not illustrated in the drawings) that pass through the left and right side walls 50L, 50R. A female threaded hole 72 is formed through a length direction intermediate portion of the lead nut 66 so as to penetrate the lead nut 66 in the seat front-rear direction, and the feed screw 64 is screwed into the female threaded hole 72. Accordingly, the front-rear movable frame 46 moves in the seat front-rear direction with respect to the base frame 26 when the feed screw 64 is rotated forward or backward by the motor 70. The head support section 74 is coupled to a front end portion of the front-rear movable frame 46.

As illustrated in FIG. 1 to FIG. 6, FIG. 12, and FIG. 13, the head support section 74 includes a frame assembly 76, a pad 78 (see FIG. 1, FIG. 2, and FIG. 12), and a covering 80. The head support section 74 is disposed at the seat front side of the front-rear movement mechanism 24. The frame assembly 76 is, for example, manufactured by resin injection molding, and overall, is formed in a plate shape with its plate thickness direction in the seat front-rear direction. The frame assembly 76 has a substantially rectangular shape as viewed along the seat front-rear direction. The pad 78 is formed by a substantially rectangular plate shaped foamed body of urethane foam or the like, and is superimposed on a front face of the frame assembly 76. The covering 80 is, for example, configured by sewing fabric, leather, or synthetic leather substantially into a bag shape. The covering 80 covers the pad 78 and the frame assembly 76. A front face of the head support section 74 configures a support face (seat face) 74A that supports the head of a seated occupant.

As illustrated in FIG. 4 to FIG. 6, and FIG. 12, a coupling portion 82 that projects toward the seat rear side is provided at a central portion of a back face (seat rear side face) of the frame assembly 76. A pair of left and right frame coupling plates 82L, 82R are formed projecting toward the seat rear side at the two seat left-right direction end portions of the coupling portion 82. A lower portion of a front end portion of the front-rear movable frame 46 is inserted between the frame coupling plates 82L, 82R. A circular through hole 47 (see FIG. 7 and FIG. 8) is formed through the lower portion of the front end portion of the front-rear movable frame 46 such that the axial direction of the circular through hole 47 runs in the seat left-right direction. A circular column shaped coupling shaft (seat face rotation shaft) 84 is inserted through the circular through hole 47. The coupling shaft 84 is, for example, attached to the front-rear movable frame 46 by insert molding. The two axial direction end portions of the coupling shaft 84 project out from the front-rear movable frame 46 toward the two seat left-right direction sides, and these projecting portions are fitted into circular through holes (not allocated reference numerals) formed in the frame coupling plates 82L, 82R so as to be capable of rotating. The frame assembly 76, namely the head support section 74, is thus coupled to the front end portion of the front-rear movable frame 46 so as to be capable of rotating about the coupling shaft 84 (about an axis running in the seat left-right direction).

As illustrated in FIG. 2 to FIG. 6, and FIG. 12, a pair of left and right link coupling plates 86L, 86R are formed to the back face of the frame assembly 76 so as to project toward the seat rear side at the seat upper side of the coupling portion 82 described above. The left and right link coupling plates 86L, 86R are formed in plate shapes with their plate thickness direction running in the seat left-right direction, and as viewed along the seat left-right direction, form substantially triangular shapes with decreasing width in the up-down direction on progression toward the seat rear side. The link coupling plates 86L, 86R are aligned to a pair of left and right link frames (link members) 92L, 92R, these being members configuring the angle changing mechanism 90.

Figure 9:
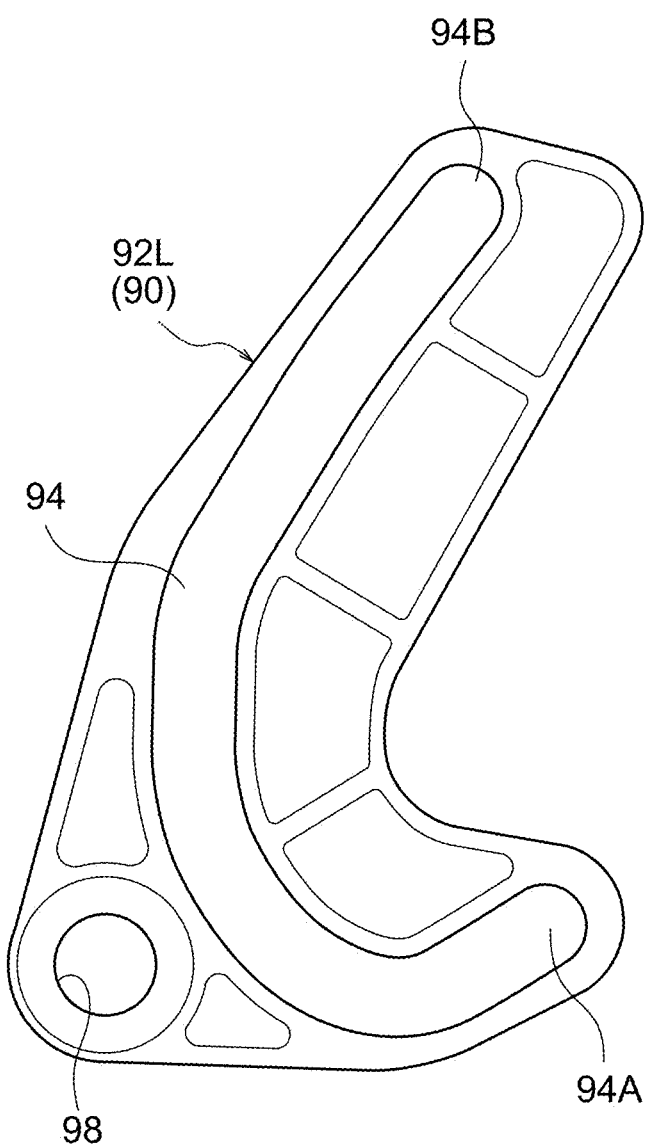
FIG. 9 is a side view illustrating a link frame as viewed from one seat left-right direction side.
Figure 10:
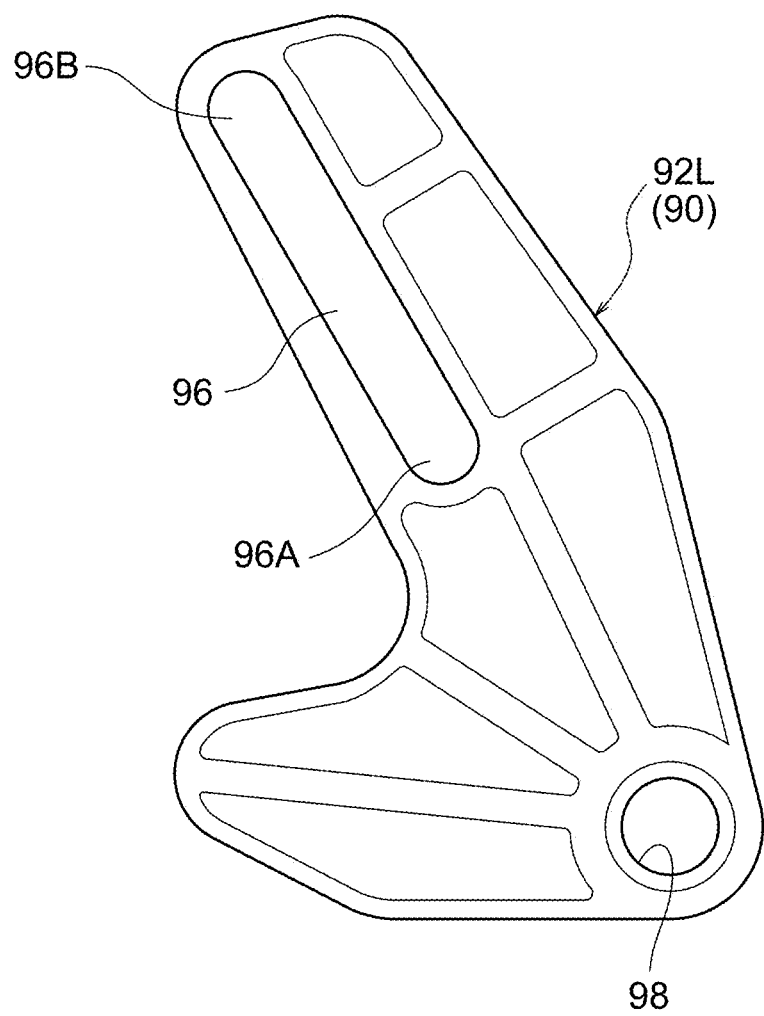
FIG. 10 is a side view illustrating a link frame as viewed from another seat left-right direction side.
Figure 11:
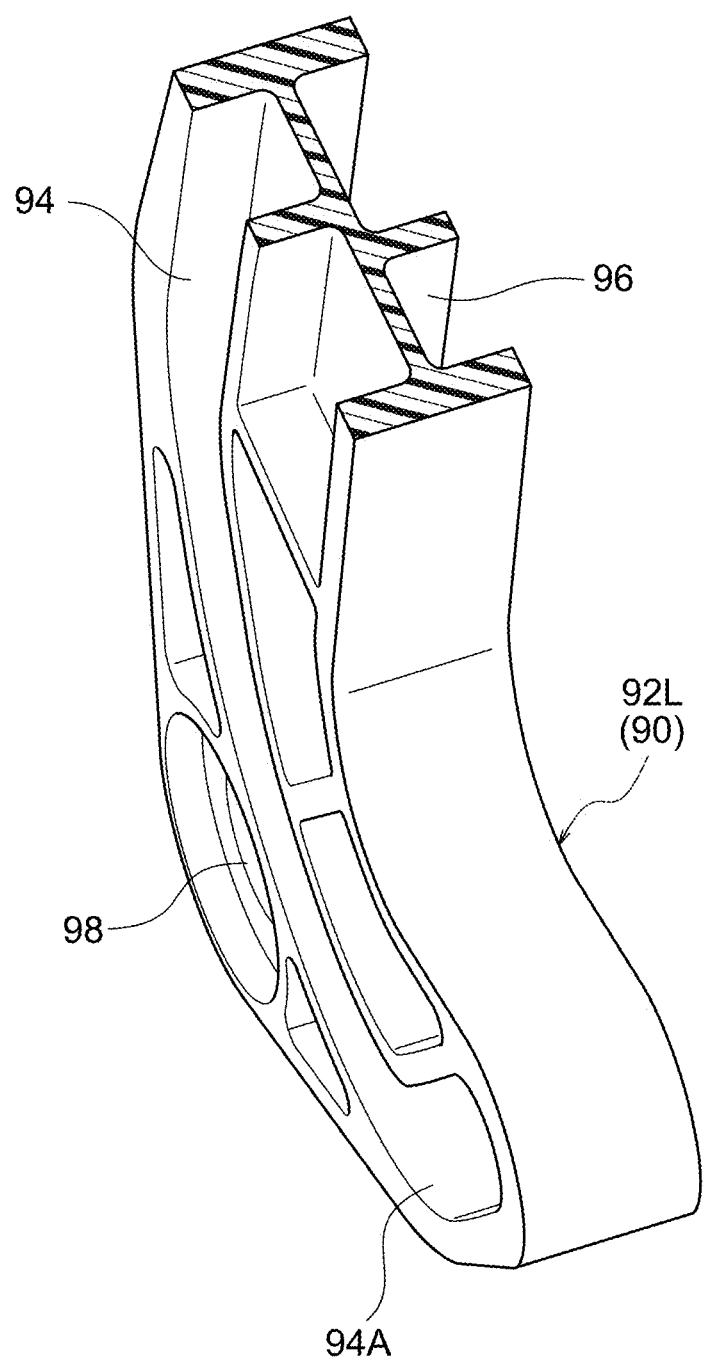
FIG. 11 is a perspective view illustrating a link frame in a partially cut-away state.
Figure 12:
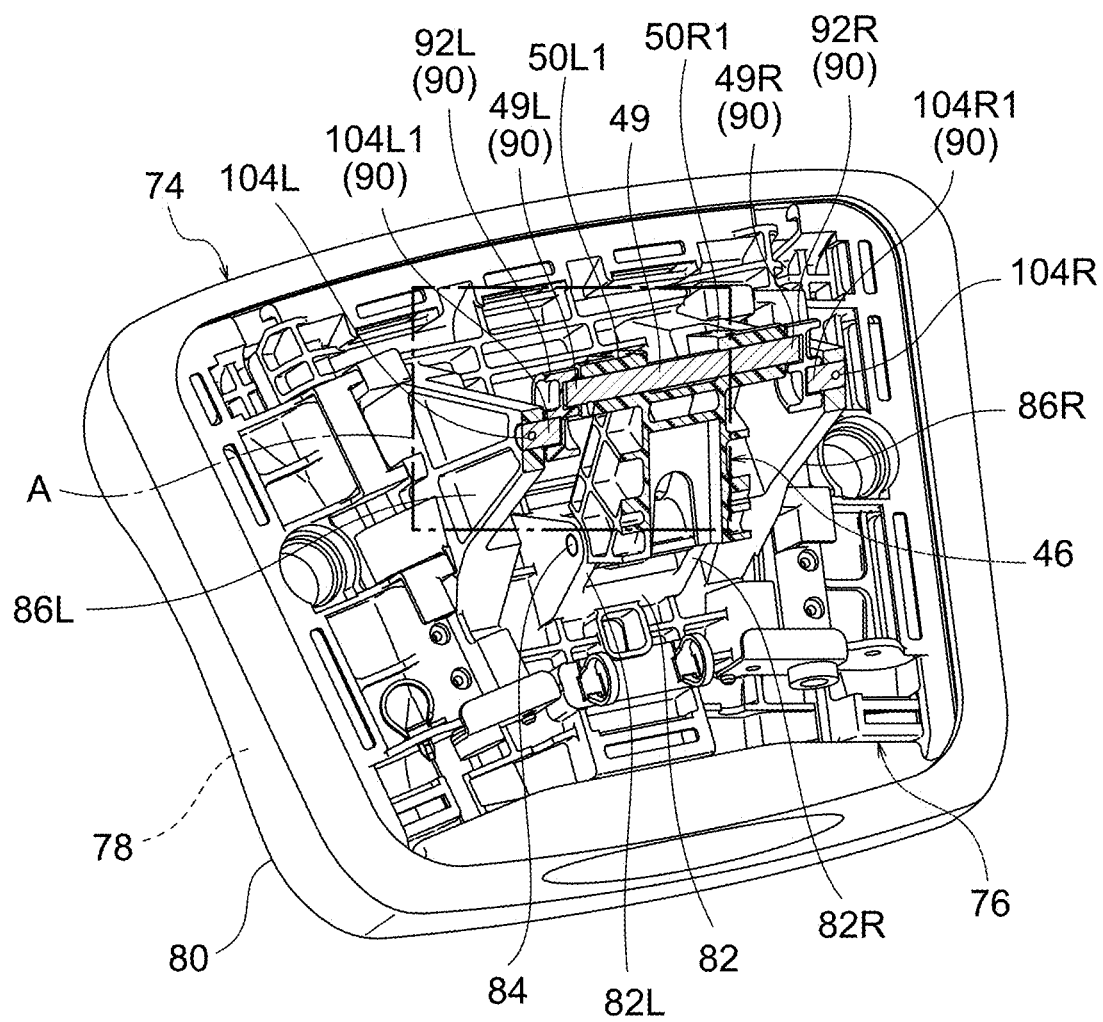
FIG. 12 is a perspective view illustrating configuration of a head support section and the vicinity thereof.
Figure 13:
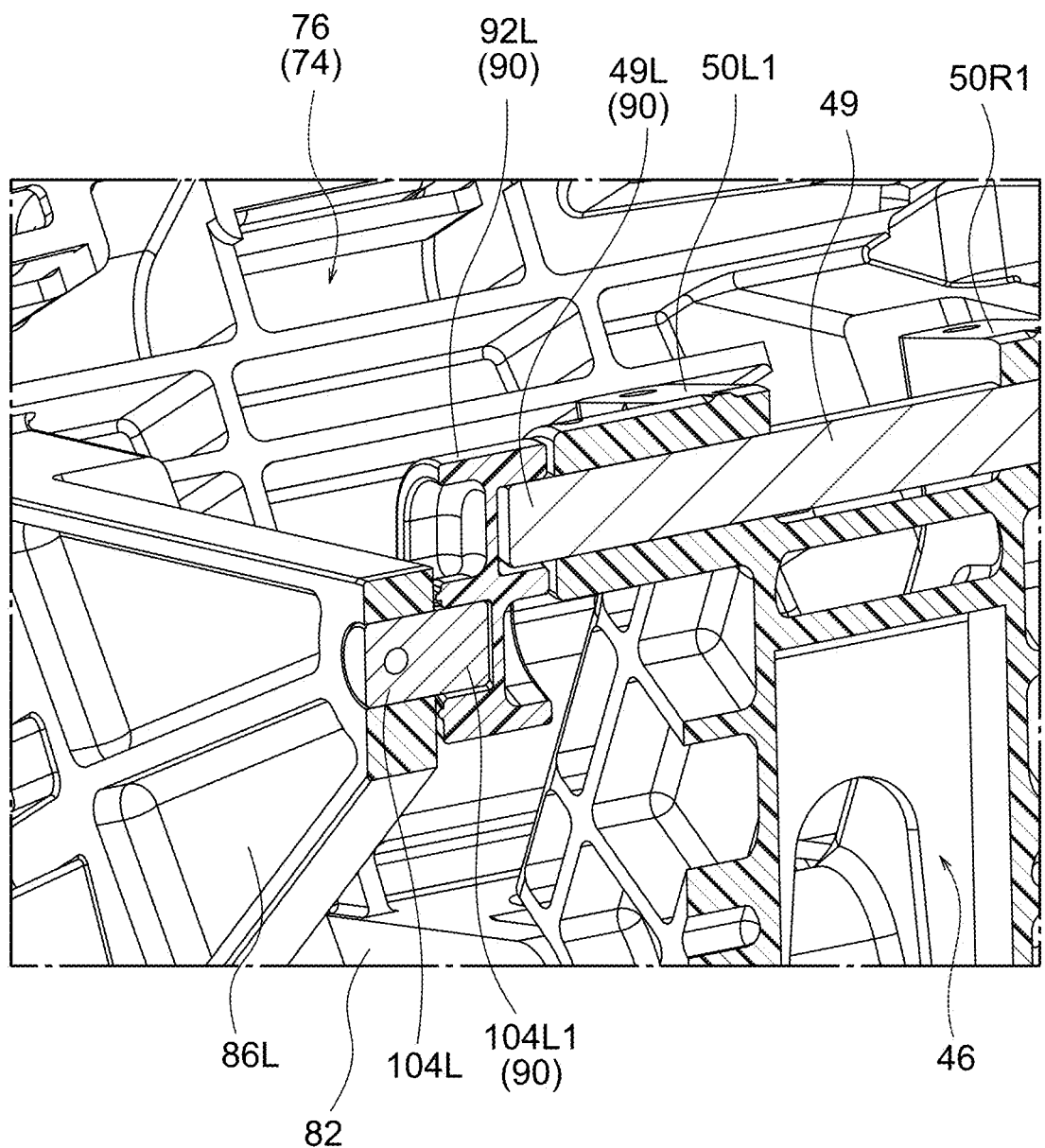
FIG. 13 is an enlarged perspective view illustrating the region A in FIG. 12 in close-up.

As illustrated in FIG. 2 to FIG. 6 and FIG. 9 to FIG. 12, the left and right link frames 92L, 92R are, for example, manufactured by resin injection molding, have a plate thickness direction running in the seat left-right direction, and are formed in substantially L-shaped plate shapes as viewed along the seat left-right direction. The link frames 92L, 92R are disposed on both seat left-right direction sides of the base frame 26 and the front-rear movable frame 46. As illustrated in FIG. 9 and FIG. 11, the link frames 92L, 92R are each formed with a substantially J-shaped angle changing groove 94 in one seat left-right direction side face (the outside faces in the seat width direction, corresponding to one seat left-right direction side). The angle changing grooves 94 are open toward the seat width direction outsides. As illustrated in FIG. 10 and FIG. 11, the other seat left-right direction side face of each link frame 92L, 92R (on the side of the seat width direction center, corresponding to another seat left-right direction side) is formed with a linear rotation groove 96. The rotation grooves 96 are open toward the side of the seat width direction center. The angle changing grooves 94 are formed substantially over the entire length direction of the link frames 92L, 92R, and the rotation grooves 96 are formed only on one length direction end side of the respective link frames (at the opposite side to the bend of the L-shaped outer profile). The angle changing grooves 94 and the rotation grooves 96 are disposed so as not to overlap with each other as viewed along the seat left-right direction. Edges of the angle changing grooves 94 and the rotation grooves 96 of the link frames 92L, 92R are formed with ribbed profiles.

The left and right link frames 92L, 92R configured as described above span between the head support section 74 and the base frame 26. Specifically, a circular through hole 98 is formed through one length direction end portion of each link frame 92L, 92R (an end portion on the side of the bend of the L-shaped outer profile). Shoulder bolts 100 that are inserted through the through holes 98 are screwed into female threaded holes 102 formed in a front end portion of the base frame 26. The axial directions of the shoulder bolts 100 run in the seat left-right direction, and the link frames 92L, 92R are coupled to the base frame 26 so as to be capable of rotating about the shoulder bolts 100 (about an axis running in the seat left-right direction).

Moreover, circular column shaped pins 104L, 104R (see FIG. 6 and FIG. 12) are provided to rear end portions of the left and right link coupling plates 86L, 86R of the frame assembly 76 such that the axial directions of the pins 104L, 104R run in the seat left-right direction. The left and right pins 104L, 104R are, for example, attached to the rear end portions of the left and right link coupling plates 86L, 86R by insert molding, and project from the rear end portions of the left and right link coupling plates 86L, 86R toward the seat width direction central side. The projecting portions of the left and right pins 104L, 104R configure second projections 104L1, 104R1 (see FIG. 12 and FIG. 13). The left and right second projections 104L1, 104R1 are configuration elements of the angle changing mechanism 90, and fit together with the angle changing grooves 94 of the respective left and right link frames 92L, 92R. The left and right link frames 92L, 92R are thus coupled to the frame assembly 76, namely to the head support section 74.

Moreover, the left and right link frames 92L, 92R are coupled to the front-rear movable frame 46 through a pin 49, illustrated in FIG. 2 to FIG. 8. The pin 49 is, for example, formed from metal in a circular column shape, and is disposed with its axial direction running in the seat left-right direction. The pin 49 is attached to an upper end portion of a front portion of the front-rear movable frame 46 in a state penetrating the upward projections 50L1, 50R1 of the front-rear movable frame 46 in the seat left-right direction. The pin 49 is, for example, attached to the front-rear movable frame 46 by insert molding. The two axial direction end portions of the pin 49 project out from the upper end portion of the front portion of the front-rear movable frame 46 toward the seat width direction outsides. The projecting portions configure first projections 49L, 49R (see FIG. 6 to FIG. 8). The left and right first projections 49L, 49R are configuration elements of the angle changing mechanism 90, and are fitted into the respective rotation grooves 96 of the left and right link frames 92L, 92R. The left and right link frames 92L, 92R are thereby coupled to the front-rear movable frame 46.

A tension coil spring 106, serving as a biasing member, spans between the pin 49 (the front-rear movable frame 46) and the frame assembly 76 of the head support section 74. The tension coil spring 106 biases the head support section 74 toward one rotation direction side with respect to the front-rear movable frame 46 (the clockwise rotation direction as viewed from the left side of the seat in this case).

In the headrest device 10 configured as described above, the base frame 26 and the bracket 22 are covered by the box shaped fixed cover 17 (see FIG. 2 and FIG. 3) that is open toward the seat front side. The fixed cover 17 is fixed to the bracket 22 by a method such as screw fastening. The substantially box-shaped movable cover 19 (see FIG. 2 and FIG. 3) that is open toward the seat front side and the seat rear side is provided at the outside of the fixed cover 17. The movable cover 19 is fixed to the front-rear movable frame 46 through a non-illustrated bracket, and covers the front-rear movable frame 46, the link frames 92L, 92R, and the like. The movable cover 19 moves in the seat front-rear direction as a unit with the front-rear movable frame 46.

Figure 2:
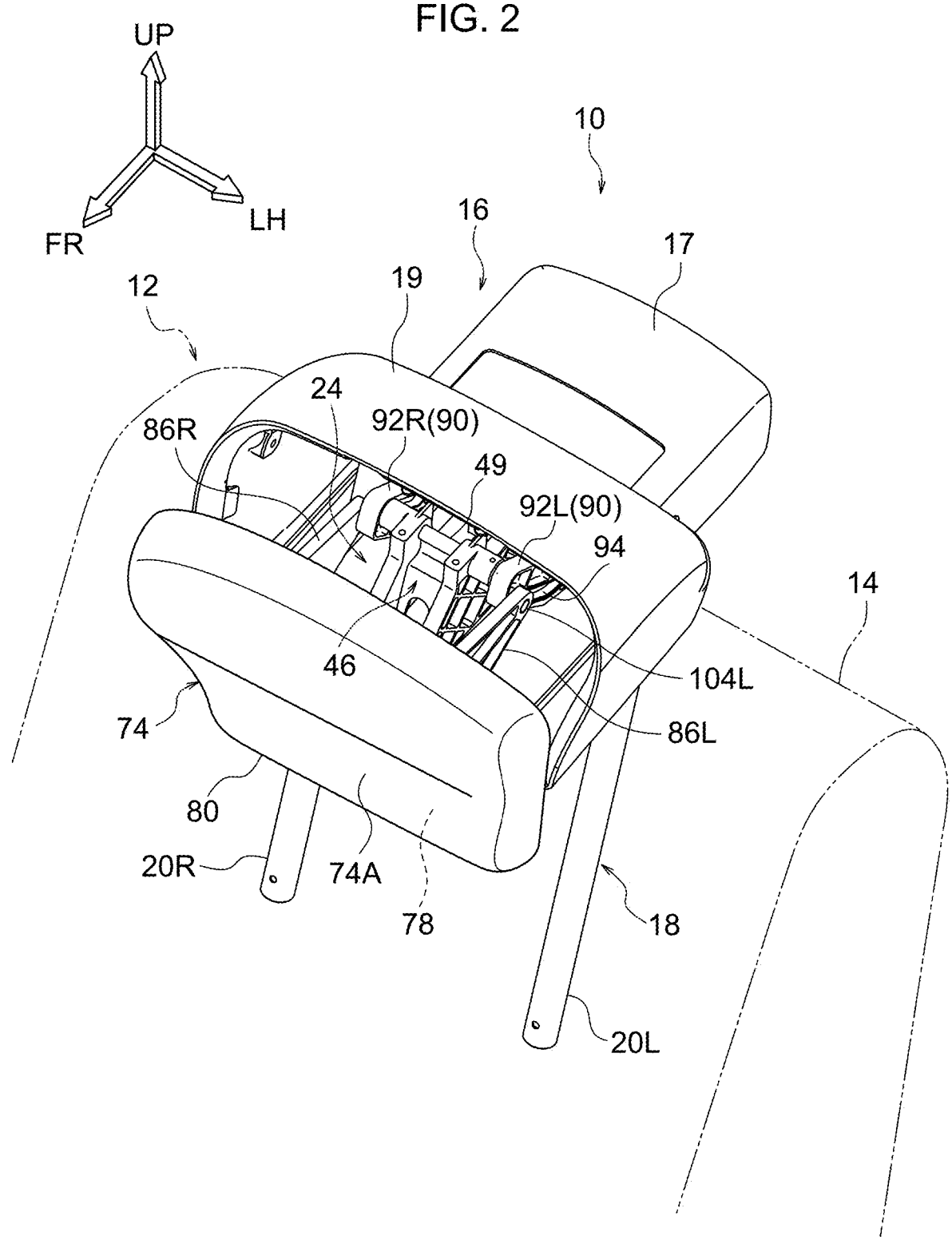
FIG. 2 is a perspective view illustrating a state in which the head support section of the headrest device is positioned at a frontmost position.
Figure 3:
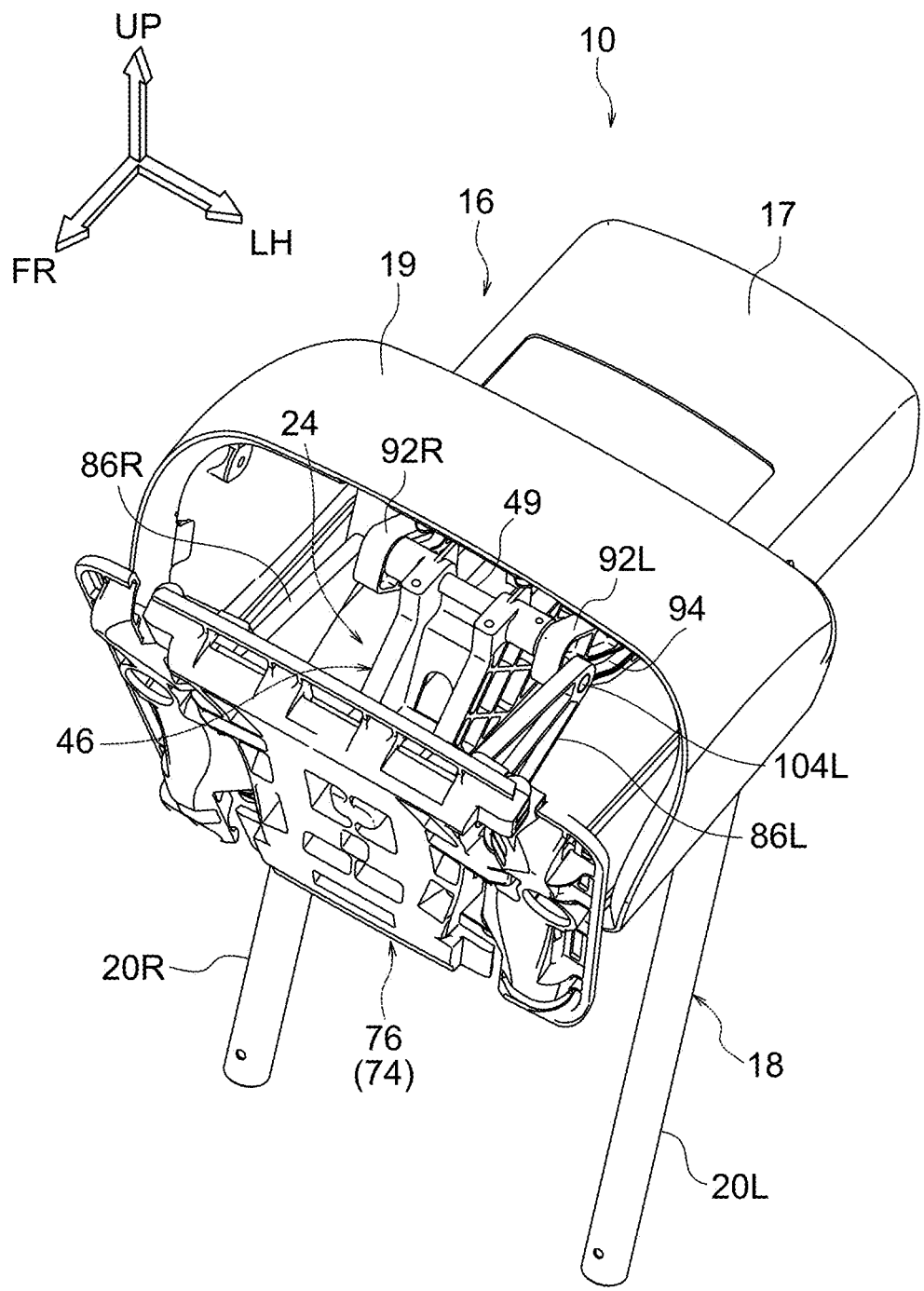
FIG. 3 is a perspective view illustrating a state in which a covering and a pad have been removed from the head support section of the headrest device illustrated in FIG. 2.

In the headrest device 10 configured as described above, the front-rear movable frame 46 moves in the seat front-rear direction with respect to the base frame 26, such that the head support section 74 that is coupled to the front-rear movable frame 46 moves in the seat front-rear direction between a rearmost position, illustrated in FIG. 1, and a frontmost position, illustrated in FIG. 2. This movement of the front-rear movable frame 46 causes the link frames 92L, 92R to rotate about the shoulder bolts 100 (about an axis in the seat left-right direction) with respect to the base frame 26. The head support section 74 accordingly rotates about the coupling shaft 84 (about an axis in the seat left-right direction) with respect to the front-rear movable frame 46.

Specifically, when the front-rear movable frame 46 moves in the seat front-rear direction with respect to the base frame 26, the left and right first projections 49L, 49R of the front-rear movable frame 46 slide within the rotation grooves 96 of the left and right link frames 92L, 92R. Accordingly, the left and right link frames 92L, 92R are rotated about the shoulder bolts 100 (about an axis in the seat left-right direction) with respect to the base frame 26. Moreover, when the left and right link frames 92L, 92R are rotated with respect to the base frame 26, the left and right second projections 104L1, 104R1 of the head support section 74 slide within the angle changing grooves 94 of the left and right link frames 92L, 92R. The head support section 74 is accordingly rotated about the coupling shaft 84 (about an axis in the seat left-right direction) with respect to the front-rear movable frame 46, thereby changing the inclination angle of the head support section 74.

Explanation follows regarding the relationships between the changing inclination angle of the head support section 74, the link frame 92L, the first projection 49L, and the second projection 104L1, with reference to FIG. 14A to FIG. 17C. Note that although relationships between the changing inclination angle of the head support section 74, the link frame 92R, the first projection 49R, and the second projection 104R1 are not illustrated, the link frames 92L, 92R, the first projections 49L, 49R, and the second projections 104L1, 104R1 operate with left-right symmetry.

Figure 14A:
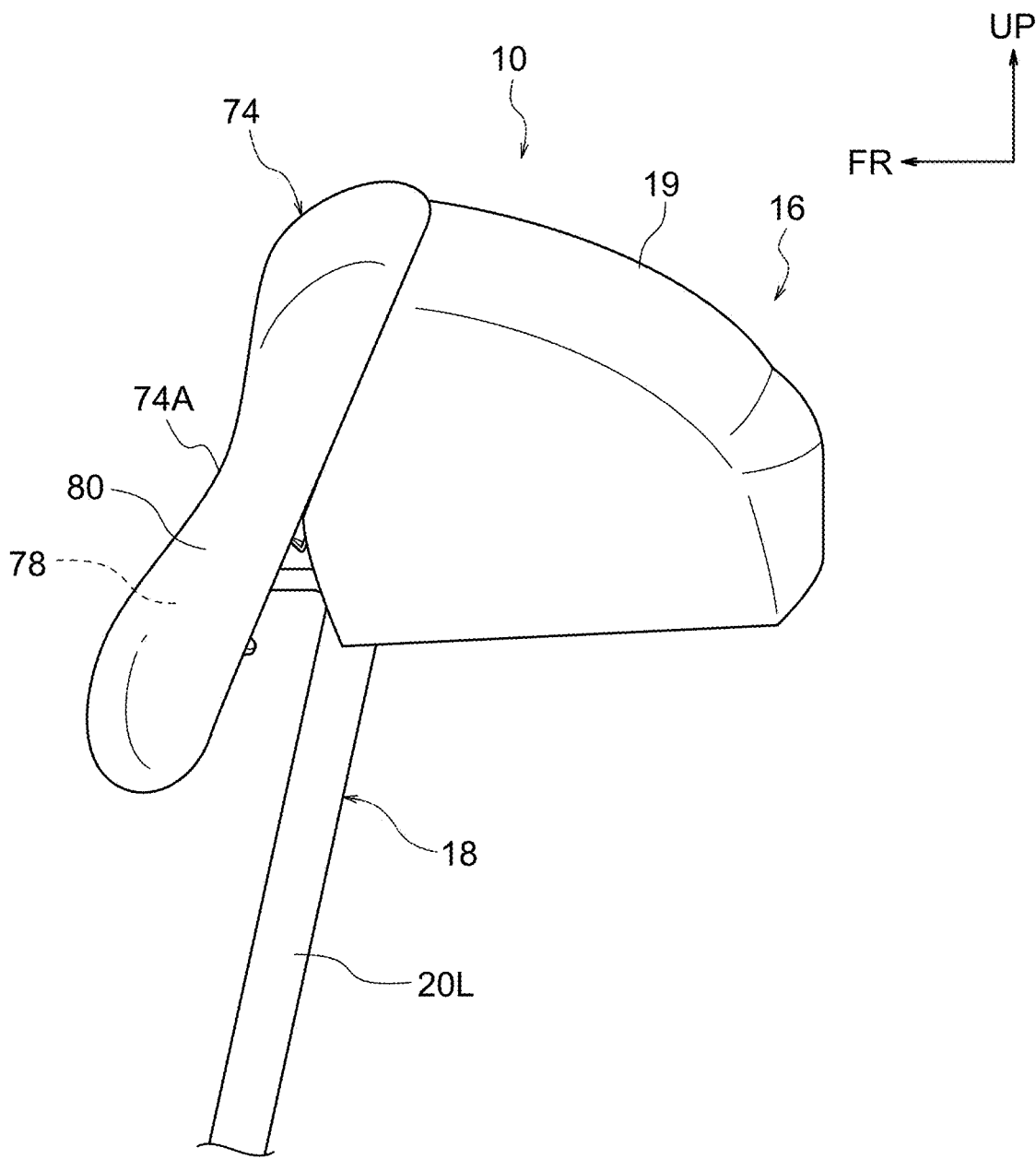
FIG. 14A is a side view illustrating a state in which the head support section of the headrest device is positioned at a rearmost position.
Figure 15A:
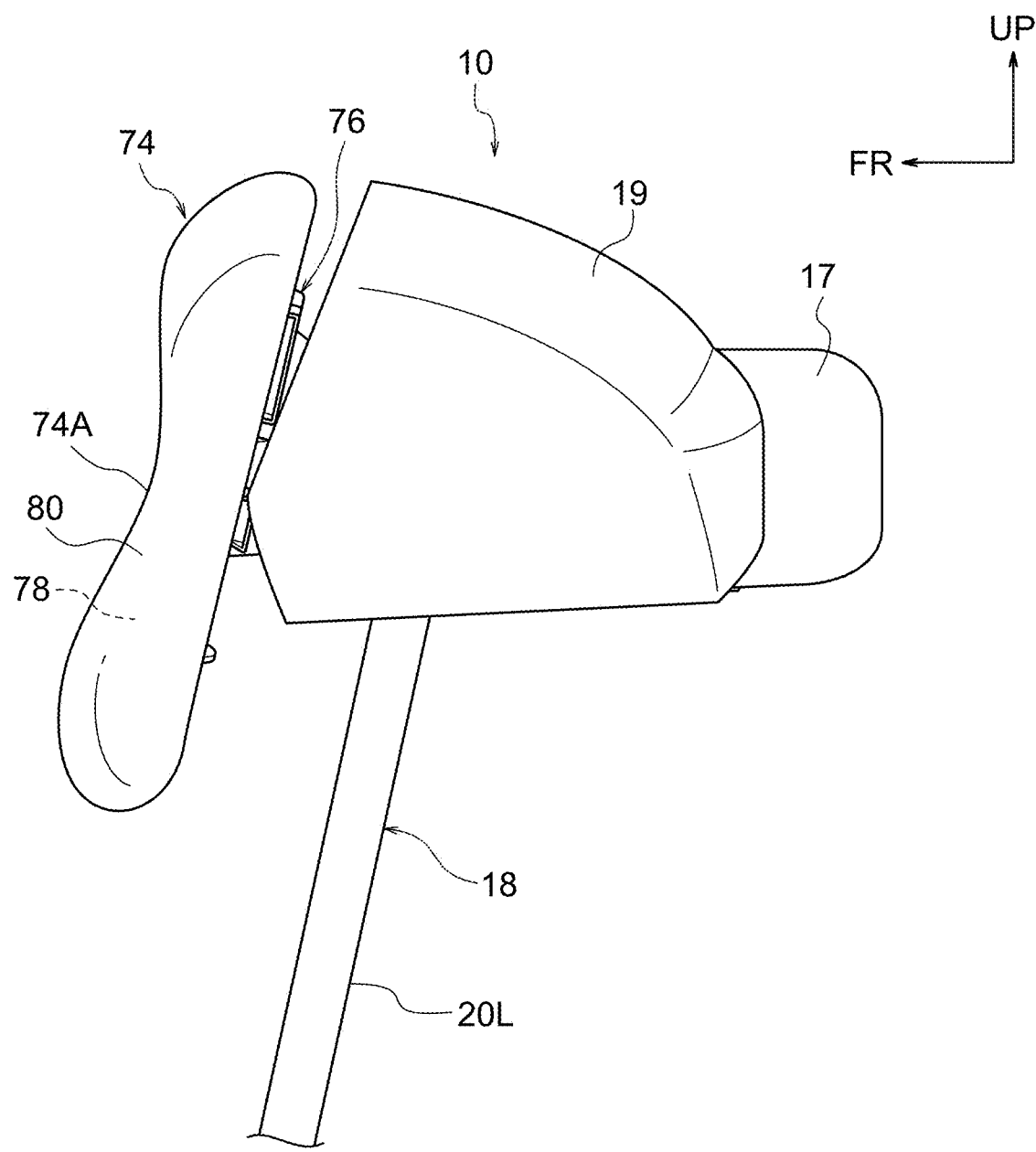
FIG. 15A is a side view illustrating a state in which the head support section of the headrest device has been moved from the rearmost position so as to be positioned slightly toward the side of the frontmost position.
Figure 15B:
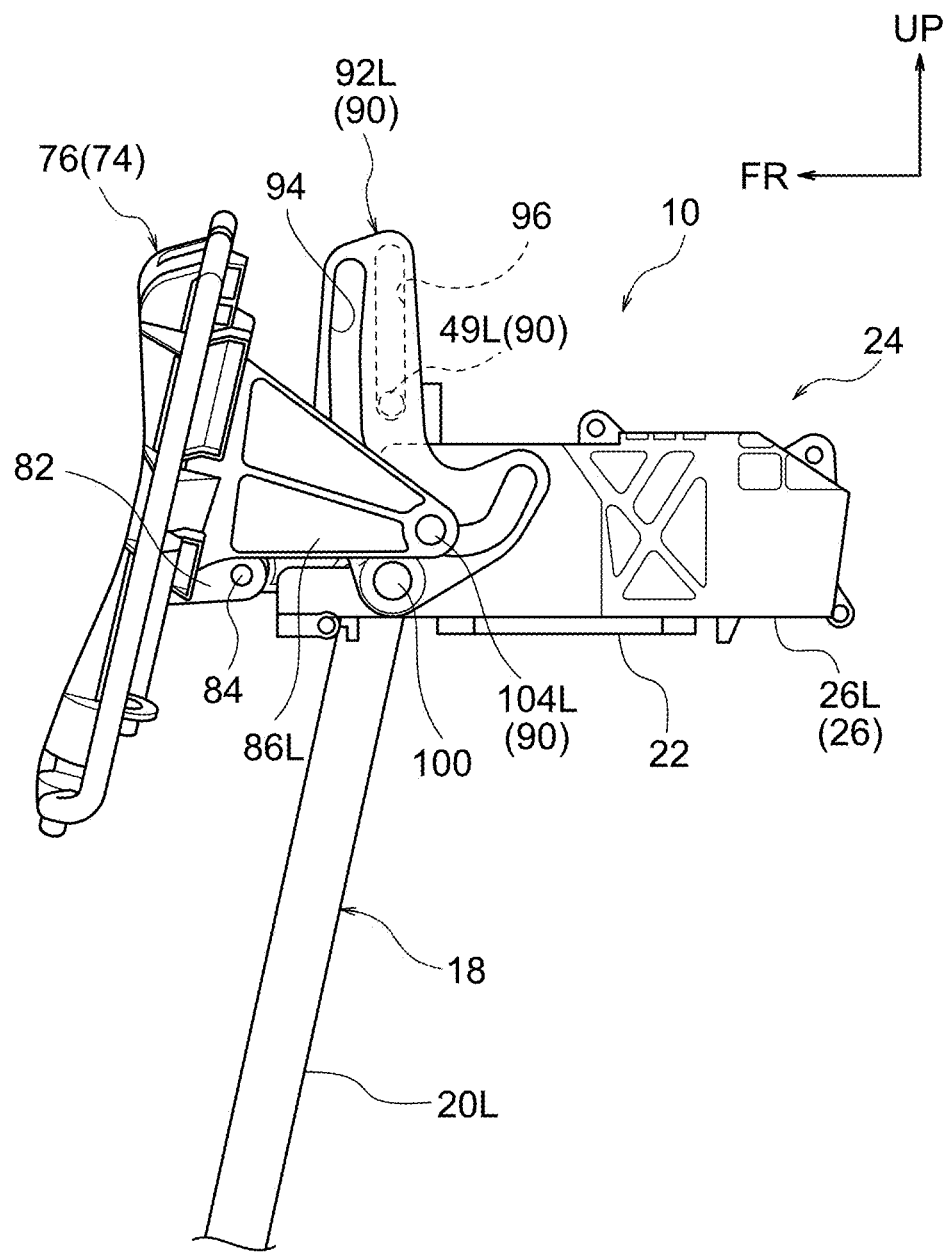
FIG. 15B is a side view illustrating a state in which the covering and the pad of the head support section, and the fixed cover and the movable cover of the base section, have been removed from the headrest device illustrated in FIG. 15A.
Figure 15C:
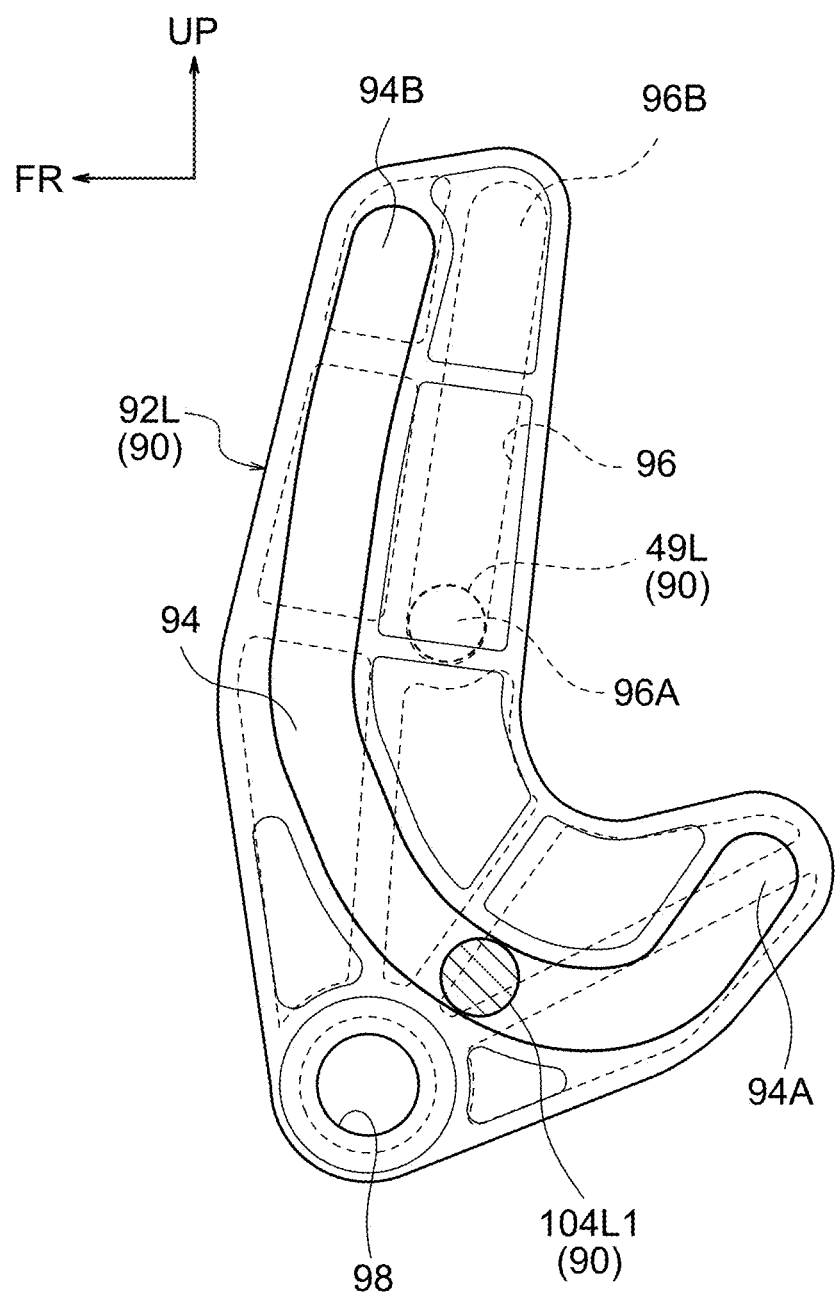
FIG. 15C is an enlarged side view illustrating the link frame illustrated in FIG. 15B.

In the present exemplary embodiment, as illustrated in FIG. 14A and FIG. 14B, in a state in which the head support section 74 is positioned at the rearmost position, the head support section 74 is inclined toward the rear with respect to the front-rear movable frame 46. In this state, as illustrated in FIG. 14C, the first projections 49L, 49R are disposed in intermediate portions of the rotation grooves 96 at a position not far from one end 96A, and the second projections 104L1, 104R1 are disposed at one end 94A of the angle changing grooves 94. Moreover, as illustrated in FIG. 15A and FIG. 15B, when the head support section 74 moves from the rearmost position slightly toward the side of the frontmost position, the head support section 74 rotates slightly toward an upright direction. In this state, as illustrated in FIG. 15C, the first projections 49L, 49R are disposed at the one end 96A of the respective rotation grooves 96, and the second projections 104L1, 104R1 are disposed in intermediate portions of the angle changing grooves 94 at a position not far from the one end 94A.

Figure 16A:
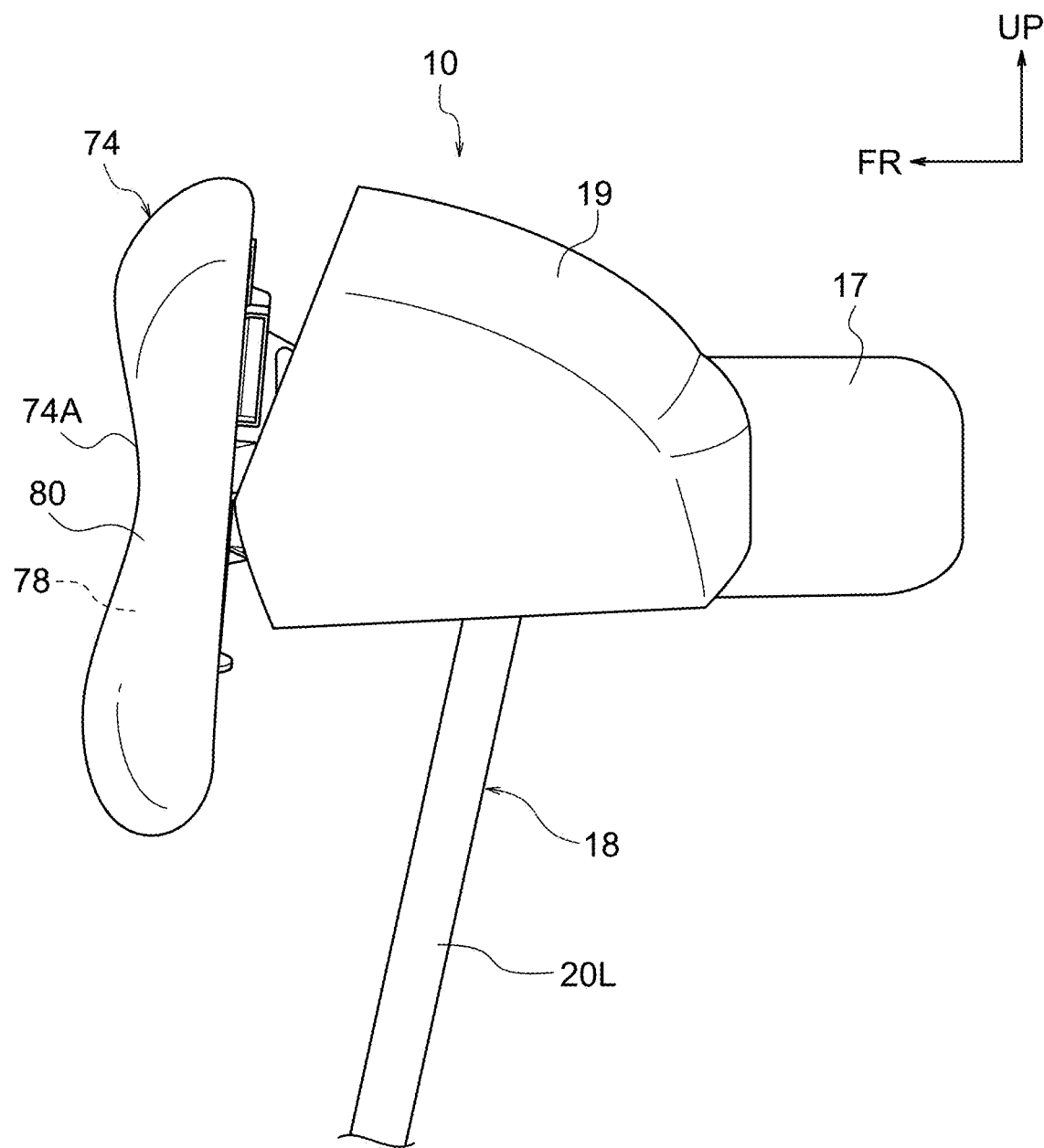
FIG. 16A is a side view illustrating a state in which the head support section of the headrest device has been moved toward the side of the frontmost position from the position illustrated in FIG. 15A.
Figure 16B:
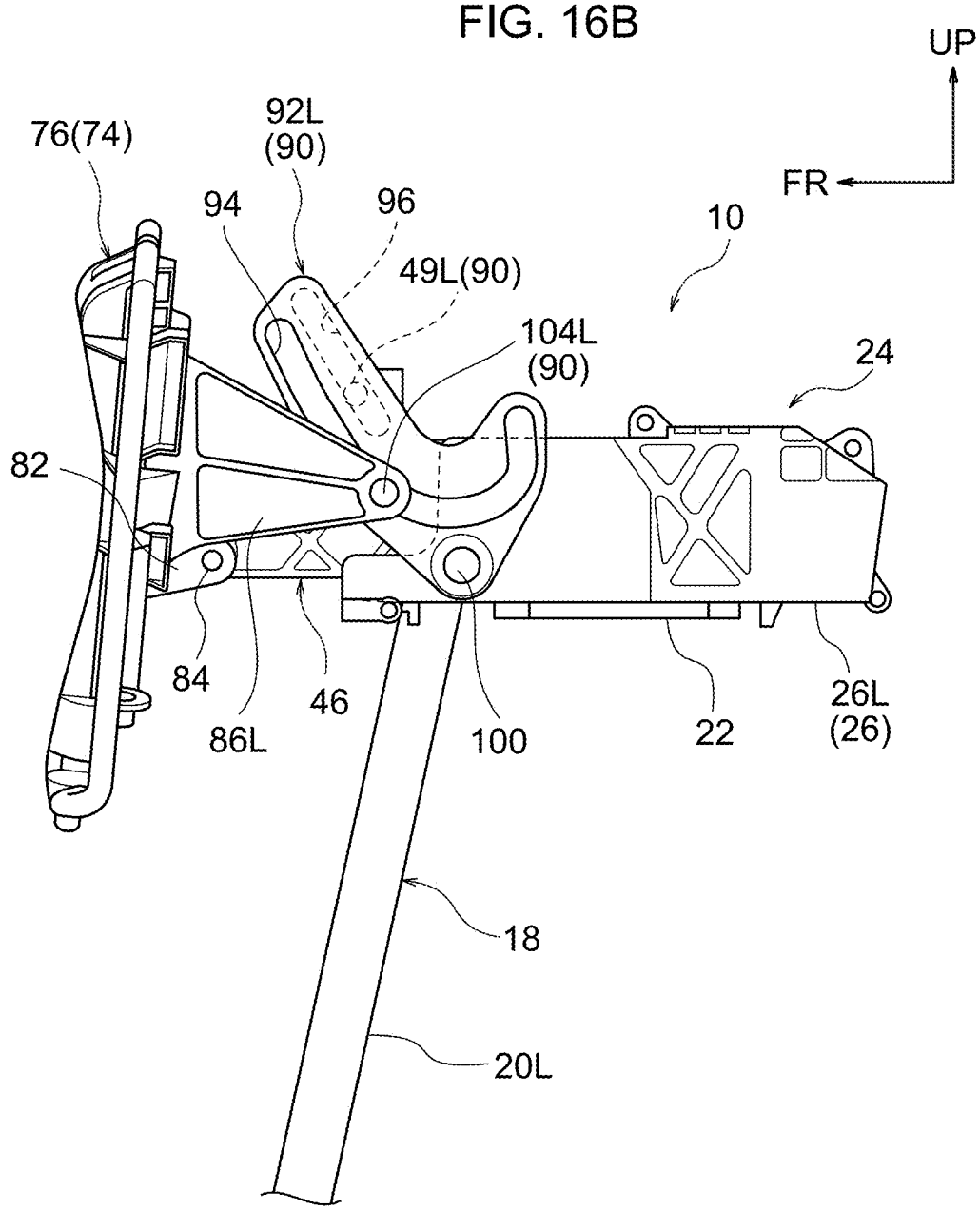
FIG. 16B is a side view illustrating a state in which the covering and the pad of the head support section, and the fixed cover and the movable cover of the base section, have been removed from the headrest device illustrated in FIG. 16A.
Figure 16C:
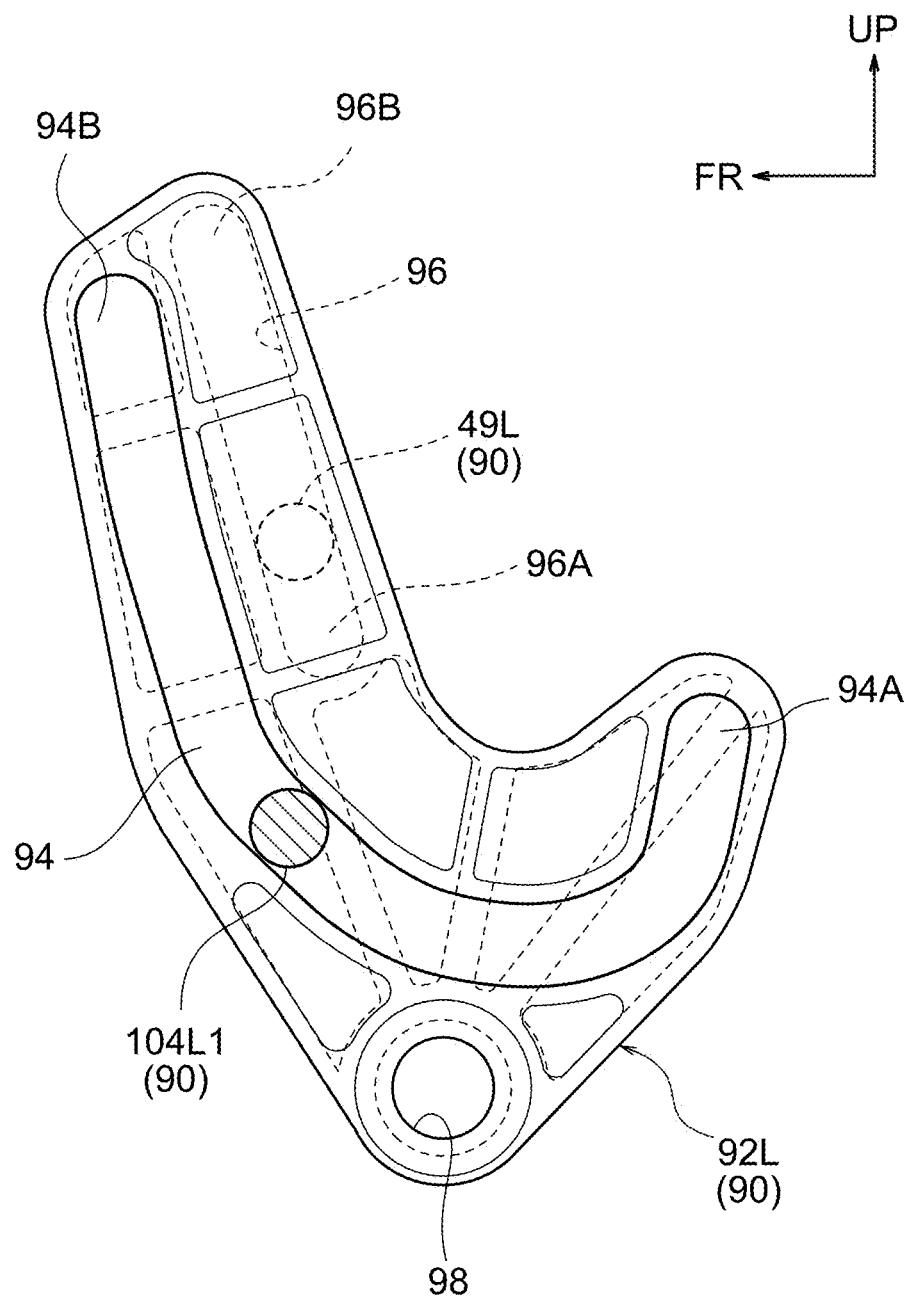
FIG. 16C is an enlarged side view illustrating the link frame illustrated in FIG. 16B.
Figure 17A:
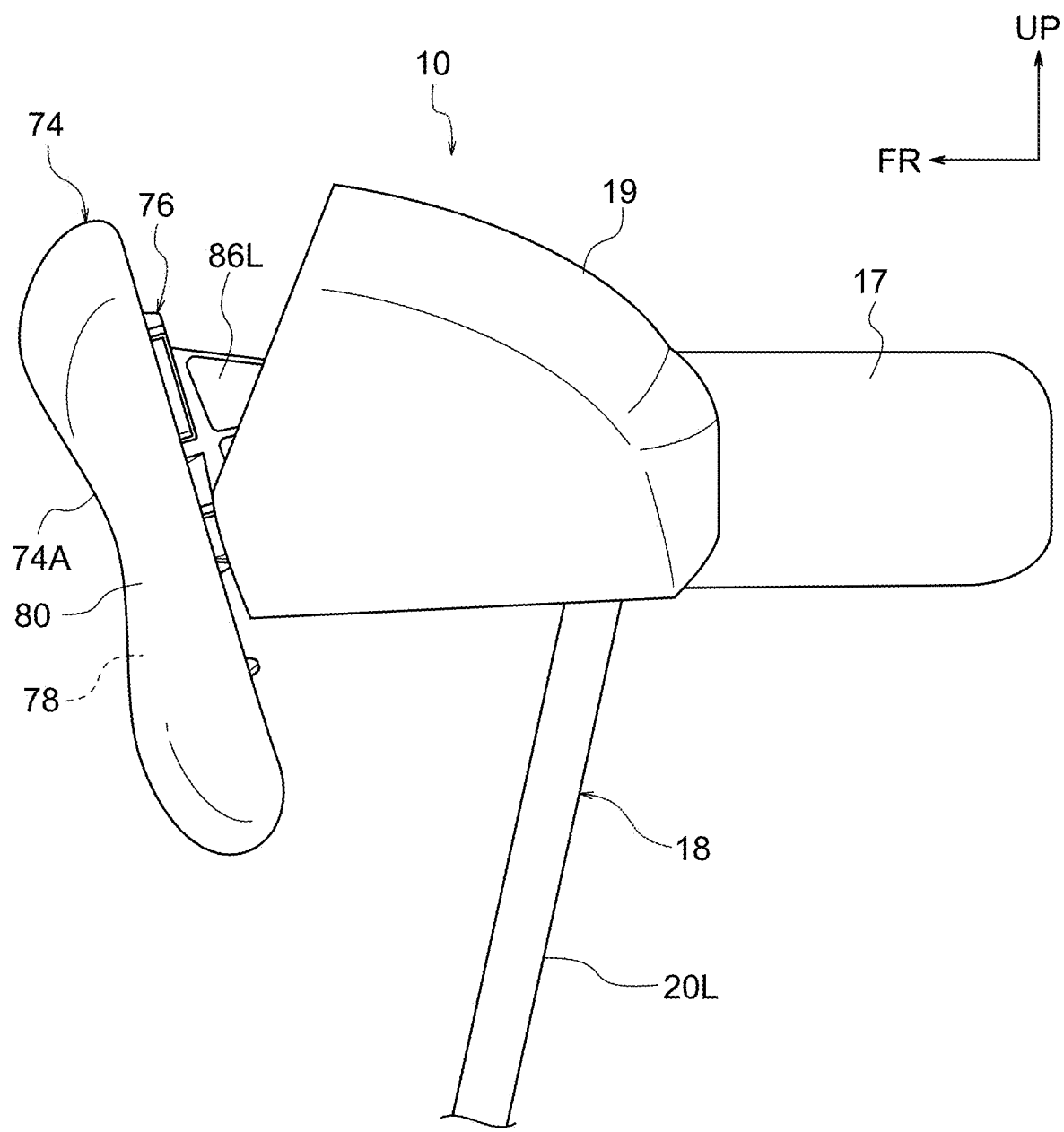
FIG. 17A is a side view illustrating a state in which the head support section of the headrest device is positioned at the frontmost position.
Figure 17B:
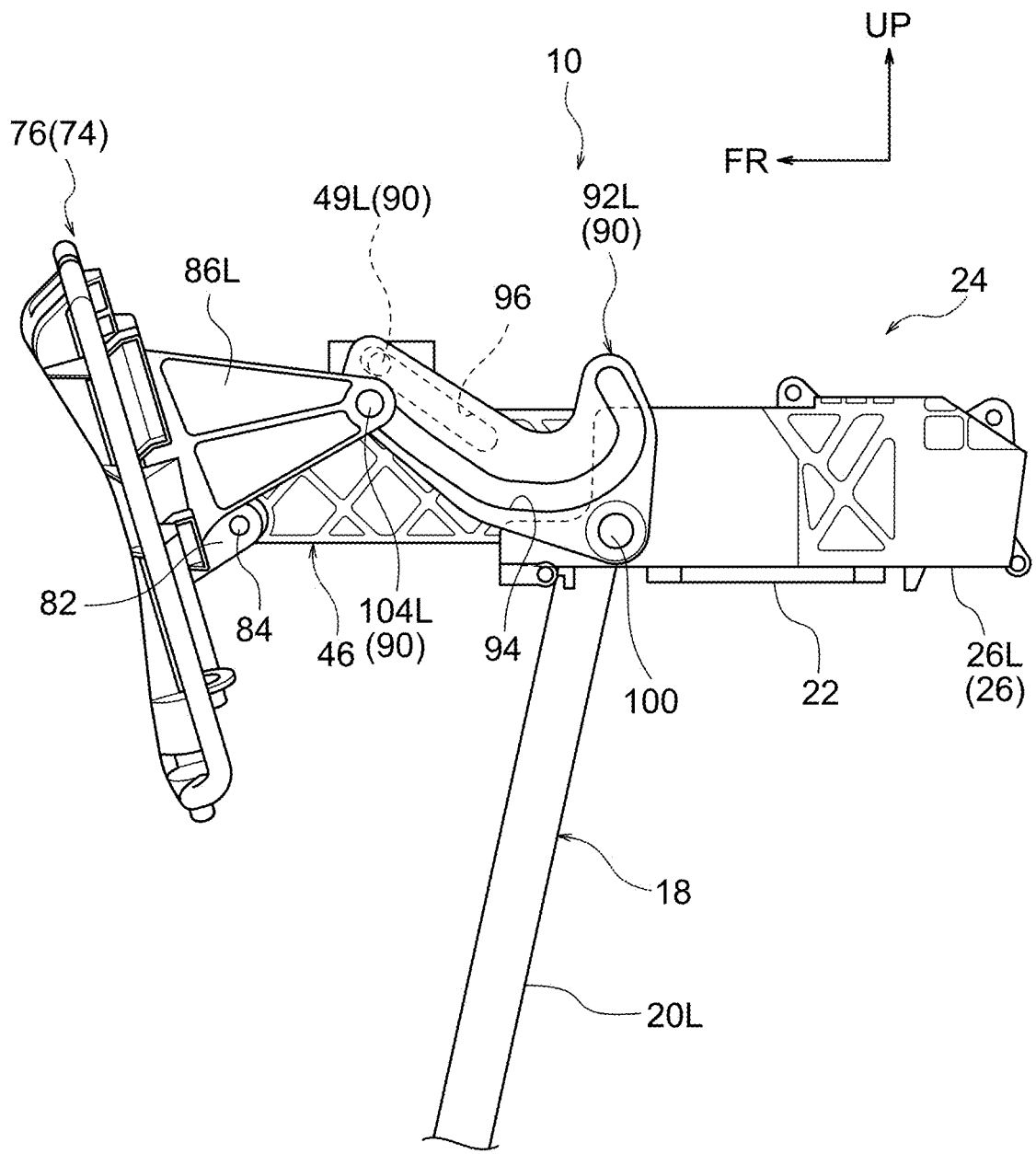
FIG. 17B is a side view illustrating a state in which the covering and the pad of the head support section, and the fixed cover and the movable cover of the base section, have been removed from the headrest device illustrated in FIG. 17A.

Moreover, as illustrated in FIG. 16A and FIG. 16B, when the head support section 74 moves further toward the side of the frontmost position than the position illustrated in FIG. 15A and FIG. 15B, the head support section 74 adopts a substantially upright state. In this state, as illustrated in FIG. 16C, the first projections 49L, 49R are disposed at an intermediate portion of the respective rotation groove 96 at a position not far from the one end 96A, and the second projections 104L1, 104R1 are disposed at substantially central portions of the angle changing grooves 94. As illustrated in FIG. 17A and FIG. 17B, in a state in which the head support section 74 is positioned at the frontmost position, the head support section 74 is inclined forward with respect to the front-rear movable frame 46. In this state, as illustrated in FIG. 17C, the first projections 49L, 49R are disposed at other end portion 96B of the respective rotation groove 96, and the second projections 104L1, 104R1 are disposed at the other end portion 94B of the respective angle changing groove 94.

Figure 18:
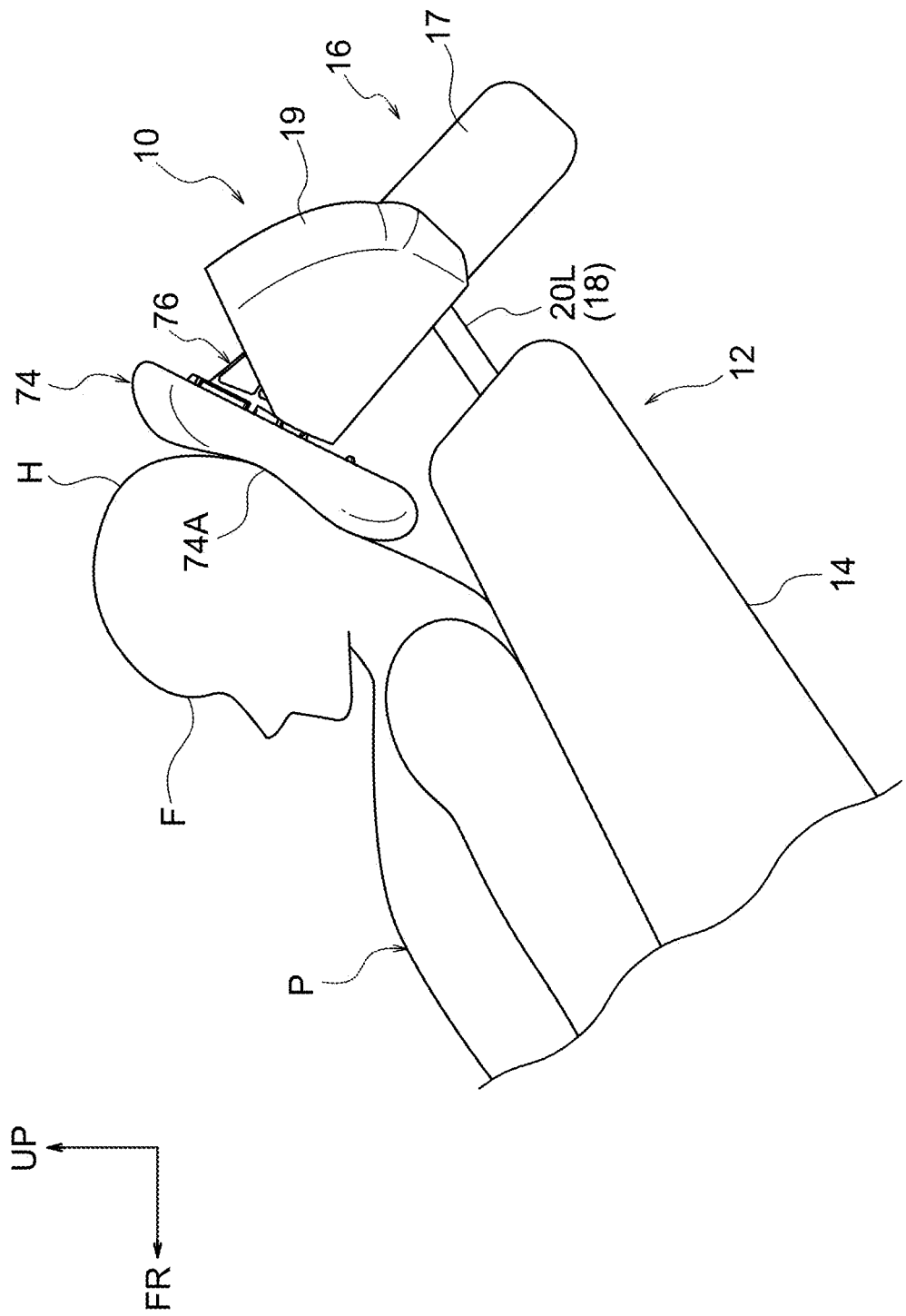
FIG. 18 is a side view illustrating a state in which the head of a seated occupant who has reclined a seatback is supported by the head support section when positioned at a frontmost position.

Note that FIG. 18 illustrates a state in which a seated occupant P has reclined the seatback 14 and the head H of the seated occupant P is supported by the head support section 74 positioned at the frontmost position. The head H of the seated occupant P is supported in an appropriate manner by the head support section 74 with the head H (face F) directed toward the vehicle front side.

Operation and Advantageous Effects

Next, explanation follows regarding operation and advantageous effects of the present exemplary embodiment.

In the headrest device 10 configured as described above, the front-rear movement mechanism 24 moves the front-rear movable frame 46 in the seat front-rear direction with respect to the base frame 26 that is supported on the upper end portion of the seatback 14. The head support section 74, of which a front face configures a support face 74A, is coupled to the front-rear movable frame 46 so as to be capable of rotating about the coupling shaft 84. The link frames 92L, 92R of the angle changing mechanism 90 span between the head support section 74 and the base frame 26. Accompanying the movement of the front-rear movable frame 46, the link frames 92L, 92R rotate with respect to the base frame 26 about the shoulder bolts 100, thereby rotating the head support section 74 with respect to the front-rear movable frame 46 about the coupling shaft 84. The inclination angle of the head support section 74 can thus be changed accompanying seat front-rear direction movement of the head support section 74. Moreover, the amount of change of the inclination angle can be modified by the setting of the shapes of the link frames 92L, 92R, thus achieving a high degree of freedom for setting the amount of change in the inclination angle.

Moreover, in the present exemplary embodiment, when the head support section 74 is moved in a seat-forward direction toward the frontmost position with respect to the base frame 26, the head support section 74 inclines forward with respect to the front-rear movable frame 46. Accordingly, for example, the head H can be supported in an appropriate manner by the head support section 74 if the head H (face F) of the seated occupant P is directed toward the vehicle front side in a state in which the seatback 14 has been reclined. The comfort of the seated occupant P can thus be improved.

Moreover, in the present exemplary embodiment, the link frames 92L, 92R that span between the head support section 74 and the base frame 26 are formed with the rotation grooves 96 and the angle changing grooves 94, each of which is open on a seat left-right direction side. The first projections 49L, 49R projecting from the front-rear movable frame 46 are fitted into the respective rotation grooves 96. The first projections 49L, 49R slide within the rotation grooves 96 of the link frames 92L, 92R as the front-rear movable frame 46 moves with respect to the base frame 26, thereby rotating the link frames 92L, 92R with respect to the base frame 26. Moreover, the second projections 104L1, 104R1 projecting from the head support section 74 are fitted into the angle changing grooves 94. The second projections 104L1, 104R1 slide within the angle changing grooves 94 of the link frames 92L, 92R as the link frames 92L, 92R rotate with respect to the base frame 26, thereby rotating the head support section 74 with respect to the front-rear movable frame 46. This configuration enables the amount of change to the inclination angle of the head support section 74 to be modified (adjusted) easily by setting the shapes of the rotation grooves 96 and the angle changing grooves 94.

Moreover, in the present exemplary embodiment, the rotation grooves 96, into which the first projections 49L, 49R projecting from the front-rear movable frame 46 are fitted, and the angle changing grooves 94, into which the second projections 104L1, 104R1 projecting from the head support section 74 are fitted, are formed in separate seat left-right direction side faces of the respective link frames 92L, 92R to each other. This facilitates setting of the shape of the front-rear movable frame 46 and the head support section 74 such that the first projections 49L, 49R and the second projections 104L1, 104R1 fit together with the rotation grooves 96 and the angle changing grooves 94, and also offers a greater degree of freedom for setting the shape of the respective grooves 94, 96. Moreover, the size of the link frames 92L, 92R can be reduced.

Moreover, in the present exemplary embodiment, the rotation grooves 96 and the angle changing grooves 94 formed in separate seat left-right direction side faces of the respective link frames 92L, 92R to each other are disposed so as not to be superimposed on each other when the link frames 92L, 92R are viewed along the seat left-right direction. This enables, for example, the link frames 92L, 92R to be configured with thinner dimensions in the seat left-right direction.

Moreover, in the present exemplary embodiment, the pair of left and right link frames 92L, 92R provided to the angle changing mechanism 90 are disposed one on either seat left-right direction side of the base frame 26 of the front-rear movement mechanism 24. The left and right link frames 92L, 92R span between the head support section 74 and the base frame 26, thereby achieving good support rigidity when the head H of the seated occupant P is being supported by the head support section 74.

Moreover, in the present exemplary embodiment, the base frame 26 is formed with the pair of upper and lower guide grooves 40, 42 running one above the other in the seat up-down direction. The guide grooves 40, 42 extend in the seat front-rear direction and open toward a seat left-right direction side. The front-rear movable frame 46 is formed with the pair of upper and lower guide projections 54, 56 that fit together with the upper and lower guide grooves 40, 42 so as to be capable of sliding with respect thereto. Of the guide projections 54, 56, at least the guide projection 56 is elongated, being formed with its length running in the seat front-rear direction. This thereby enables the front-rear movable frame 46 to be prevented or effectively suppressed from rattling against the base frame 26, while the front-rear movable frame 46 is supported by the base frame 26 such that the front-rear movable frame 46 is capable of moving in the seat front-rear direction with respect to the base frame 26.

Moreover, in the present exemplary embodiment, the head support section 74 that is rotatably coupled to the front-rear movable frame 46 is suppressed from rotating with respect to the front-rear movable frame 46 by the link frames 92L, 92R that span between the head support section 74 and the base frame 26. Moreover, the head support section 74 is biased toward the one rotation direction side with respect to the front-rear movable frame 46 by the tension coil spring 106 that spans between the head support section 74 and the front-rear movable frame 46. Rattling of the head support section 74 can thus be prevented or effectively suppressed.

Moreover, in the present exemplary embodiment, the feed screw mechanism 60 that moves the front-rear movable frame 46 in the seat front-rear direction with respect to the base frame 26 is configured including the feed screw 64 that rotates about an axis running in the seat front-rear direction. This thereby enables a simple and compact configuration that secures a large movement stroke of the front-rear movable frame 46.

Moreover, in the exemplary embodiment described above, the first projections 49L, 49R projecting from the head support section 74 fit together with the rotation grooves 96 of the link frames 92L, 92R, such that movement of the front-rear movable frame 46 (moving member) and rotation of the link frames 92L, 92R (link members) are coordinated with each other. However, there is no limitation thereto. For example, a rack that moves as a unit with a moving member may be meshed with a pinion provided at a rotational center of a link member in order to coordinate the movement of the moving member with the rotation of the link member.

Various other modifications may be implemented within a range not departing from the spirit of the present disclosure. Obviously, the scope of rights of the present disclosure is not limited to the exemplary embodiment described above.

What is claimed is:

1. A headrest device comprising:
   a front-rear movement mechanism that moves a moving member in a seat front-rear direction with respect to a base member supported at an upper end portion of a seatback;
   a head support section that is coupled to the moving member so as to be capable of rotating about an axis running in a seat left-right direction, and that includes a front face configuring a support face to support a head of a seated occupant; and
   an angle changing mechanism that includes a link member spanning between the head support section and the base member, the link member being rotated with respect to the base member about an axis running in the seat left-right direction by the movement of the moving member so as to rotate the head support section with respect to the moving member about an axis running in the seat left-right direction, wherein:
the link member is formed with a rotation groove and an angle changing groove, each being open toward a seat left-right direction side; and
the angle changing mechanism includes
a first projection that projects from the moving member and fits together with the rotation groove, and that slides within the rotation groove during movement of the moving member with respect to the base member so as to rotate the link member with respect to the base member, and
a second projection that projects from the head support section and fits together with the angle changing groove, and that slides within the angle changing groove during rotation of the link member with respect to the base member so as to rotate the head support section with respect to the moving member.

2. The headrest device of claim 1, wherein the angle changing mechanism causes the head support section to incline forward with respect to the moving member when the head support section moves in a seat-forward direction with respect to the base member.

3. The headrest device of claim 1, wherein the angle changing groove is formed in one seat left-right direction side face of the link member, and the rotation groove is formed in another seat left-right direction side face of the link member.

4. The headrest device of claim 3, wherein the rotation groove and the angle changing groove are disposed so as not to be superimposed on one another when the link member is viewed along the seat left-right direction.

5. The headrest device of claim 1, wherein the angle changing mechanism includes a left and right pair of the link members disposed one on either seat left-right direction side of the base member.

6. A headrest device comprising:
a front-rear movement mechanism that moves a moving member in a seat front-rear direction with respect to a base member supported at an upper end portion of a seatback;
a head support section that is coupled to the moving member so as to be capable of rotating about an axis running in a seat left-right direction, and that includes a front face configuring a support face to support a head of a seated occupant; and
an angle changing mechanism that includes a link member spanning between the head support section and the base member, the link member being rotated with respect to the base member about an axis running in the seat left-right direction by the movement of the moving member so as to rotate the head support section with respect to the moving member about an axis running in the seat left-right direction,
wherein:
the base member is formed with a pair of upper and lower guide grooves running above and below one another in a seat up-down direction, each guide groove extending in the seat front-rear direction and being open on a seat left-right direction side;
the moving member is formed with a pair of upper and lower guide projections, the respective guide projections being fitted together with the pair of guide grooves so as to be capable of sliding along the guide grooves; and
of the pair of upper and lower guide projections, at least one guide projection is formed in an elongated shape with its length in the seat front-rear direction.

7. The headrest device of claim 1, further comprising a biasing member that spans between the head support section and the moving member, and that biases the head support section toward one rotation direction side with respect to the moving member.

8. The headrest device of claim 1, wherein the front-rear movement mechanism includes a feed screw mechanism configured including a feed screw which is rotated about an axis running in the seat front-rear direction, and the moving member is moved in the seat front-rear direction with respect to the base member by the feed screw mechanism.

9. The headrest device of claim 1, further comprising a fixed cover that covers the base member and a movable cover that covers the moving member, wherein the movable cover moves in the seat front-rear direction as a unit with the moving member.

10. The headrest device of claim 1, wherein the rotation groove is formed in a linear shape, and the angle changing groove is formed in a J-shape.

11. The headrest device of claim 1, wherein an edge of the rotation groove of the link member and an edge of the angle changing groove of the link member are formed with a ribbed profile.

* * * * *